US012152436B2

(12) United States Patent
Kirby

(10) Patent No.: US 12,152,436 B2
(45) Date of Patent: Nov. 26, 2024

(54) BATTERY-POWERED ROMAN SHADE SYSTEM

(71) Applicant: Lutron Technology Company LLC, Coopersburg, PA (US)

(72) Inventor: David A. Kirby, Zionsville, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 168 days.

(21) Appl. No.: 17/882,221

(22) Filed: Aug. 5, 2022

(65) Prior Publication Data

US 2023/0042244 A1 Feb. 9, 2023

Related U.S. Application Data

(60) Provisional application No. 63/230,166, filed on Aug. 6, 2021.

(51) Int. Cl.
*E06B 9/322* (2006.01)
*E06B 9/262* (2006.01)

(52) U.S. Cl.
CPC .............. *E06B 9/322* (2013.01); *E06B 9/262* (2013.01); *E06B 2009/2622* (2013.01)

(58) Field of Classification Search
CPC ..... E06B 9/34; E06B 9/40; E06B 9/44; E06B 9/56; E06B 9/68; E06B 9/70; E06B 9/72; E06B 2009/2622
See application file for complete search history.

(56) References Cited

U.S. PATENT DOCUMENTS

| | | | | |
|---|---|---|---|---|
| 5,482,100 | A | 1/1996 | Kuhar | |
| 5,990,646 | A | 11/1999 | Kovach et al. | |
| 6,135,189 | A * | 10/2000 | Weinreich | E06B 9/62 160/171 |
| 6,382,294 | B1 | 5/2002 | Anderson et al. | |
| 6,433,498 | B1 | 8/2002 | Domel et al. | |
| 6,736,186 | B2 | 5/2004 | Anderson et al. | |
| 6,850,017 | B1 | 2/2005 | Domel et al. | |
| 7,281,561 | B2 * | 10/2007 | Anderson | E06B 9/264 52/204.5 |

(Continued)

FOREIGN PATENT DOCUMENTS

CN 109695411 A 4/2019

*Primary Examiner* — Johnnie A. Shablack
(74) *Attorney, Agent, or Firm* — Philip N. Smith; Glen R. Farbanish; Michael S. Czarnecki

(57) ABSTRACT

A battery-powered Roman shade system may comprise first and second brackets for mounting the shade system to a structure, a roller tube rotatably supported by the first and second brackets, and a housing configured to receive, at a first end of the housing, one or more batteries for powering a motor drive unit inside the roller tube. The housing may also be configured to support a lift assistance subsystem at a second end of the housing. The lift assistance subsystem is configured to provide variable lift assistance to the motor drive unit. The shade system may also comprise a battery holder for holding the one or more batteries. For example, the housing may comprise an internal compartment for housing the battery holder and the lift assistance subsystem. In addition, the shade system may comprise a gear assembly configured to mechanically couple the roller tube to the lift assistance subsystem.

25 Claims, 17 Drawing Sheets

(56) References Cited

U.S. PATENT DOCUMENTS

| | | | | |
|---|---|---|---|---|
| 7,380,582 | B1 * | 6/2008 | Anderson | E06B 9/34 248/267 |
| 7,401,634 | B2 | 7/2008 | Kovach et al. | |
| 7,857,030 | B2 | 12/2010 | Cheng | |
| 8,299,734 | B2 | 10/2012 | Mullet et al. | |
| 8,368,328 | B2 | 2/2013 | Mullet et al. | |
| 8,540,005 | B2 | 9/2013 | Baugh et al. | |
| 8,659,246 | B2 | 2/2014 | Mullet et al. | |
| 8,791,658 | B2 | 7/2014 | Mullet et al. | |
| 8,851,141 | B2 | 10/2014 | Blair et al. | |
| 8,919,419 | B2 * | 12/2014 | Mullet | E06B 9/62 160/310 |
| 8,950,461 | B2 | 2/2015 | Adams et al. | |
| 9,045,939 | B2 | 6/2015 | Blair et al. | |
| 9,103,157 | B2 * | 8/2015 | Mullet | E06B 9/62 |
| 9,115,537 | B2 | 8/2015 | Blair | |
| 9,152,032 | B2 * | 10/2015 | Mullet | G08C 23/04 |
| 9,260,914 | B2 * | 2/2016 | Certain | E06B 9/44 |
| 9,488,000 | B2 | 11/2016 | Kirby et al. | |
| 9,670,724 | B2 * | 6/2017 | Oakley | E06B 9/60 |
| 9,702,187 | B2 * | 7/2017 | Holt | E06B 9/262 |
| 9,765,565 | B2 * | 9/2017 | Morris | E06B 9/262 |
| 9,810,020 | B2 | 11/2017 | Adams et al. | |
| 10,329,816 | B2 * | 6/2019 | Wong | E06B 9/06 |
| 10,626,667 | B2 * | 4/2020 | Schulman | E06B 9/322 |
| 10,738,530 | B2 * | 8/2020 | Campagna | E06B 9/42 |
| 10,895,105 | B1 * | 1/2021 | Marchese | E06B 9/322 |
| 11,002,071 | B2 * | 5/2021 | Campagna | E06B 9/72 |
| 11,149,489 | B2 * | 10/2021 | Spray | E06B 9/322 |
| 11,421,473 | B2 * | 8/2022 | Campagna | E06B 9/72 |
| 11,434,690 | B2 * | 9/2022 | He | E06B 9/322 |
| 11,613,926 | B2 * | 3/2023 | Dahlgren | E06B 9/62 160/310 |
| 11,788,348 | B2 * | 10/2023 | Blair | E06B 9/44 160/10 |
| 2006/0169419 | A1 | 8/2006 | Cheng | |
| 2007/0284053 | A1 | 12/2007 | Mullet et al. | |
| 2008/0202709 | A1 | 8/2008 | Anderson et al. | |
| 2009/0014132 | A1 | 1/2009 | Cheng | |
| 2009/0199975 | A1 | 8/2009 | Yeh | |
| 2010/0092855 | A1 | 4/2010 | Cheng | |
| 2010/0269988 | A1 | 10/2010 | Mullet et al. | |
| 2010/0294438 | A1 | 11/2010 | Kirby et al. | |
| 2012/0073765 | A1 * | 3/2012 | Hontz | E06B 9/304 160/331 |
| 2012/0090797 | A1 | 4/2012 | Mullet et al. | |
| 2013/0233496 | A1 | 9/2013 | Ogden, Jr. et al. | |
| 2014/0305601 | A1 | 10/2014 | Mullet et al. | |
| 2016/0201389 | A1 | 7/2016 | Oakley | |
| 2016/0369558 | A1 * | 12/2016 | Kirby | E06B 9/42 |
| 2017/0079459 | A1 | 3/2017 | Filko | |
| 2018/0202224 | A1 * | 7/2018 | Kumar | E06B 9/42 |
| 2020/0284093 | A1 * | 9/2020 | Dahlgren | E06B 9/62 |
| 2021/0262286 | A1 * | 8/2021 | Campagna | E06B 9/60 |
| 2021/0367542 | A1 * | 11/2021 | Adams | H02J 7/0063 |
| 2023/0340834 | A1 * | 10/2023 | Schmick | E06B 9/50 |
| 2023/0417097 | A1 * | 12/2023 | Poikonen | E06B 9/74 |

* cited by examiner

BATTERY-POWERED ROMAN SHADE SYSTEM

CROSS-REFERENCE TO RELATED APPLICATIONS

This application claims the priority benefit of U.S. Provisional Patent Application No. 63/230,166, filed Aug. 6, 2021, entitled BATTERY-POWERED ROMAN SHADE SYSTEM, the entire disclosure of which is hereby incorporated by reference.

DESCRIPTION OF THE RELATED ART

Typical window treatments (e.g., such as, for example, roller shades, draperies, Roman shades, and Venetian blinds) may be mounted in front of windows to prevent sunlight from entering a space and/or to provide privacy. Many types of window treatments may be moved between a fully-raised (e.g., a fully-open position) and a fully-lowered (e.g., a fully-closed position), as well placed in any number of positions between the fully-raised and fully-lowered positions. The actuation of the window treatments may be manual or powered. For powered systems, which use a motor to control the movement of the window treatments, the motor may be powered by a power source. The power source may be a fixed power source, e.g., an alternating-current (AC) source or a direct-current (DC) power source connected to the internal electrical wiring of the dwelling (e.g., home, office, etc.), or may be from a temporary or replaceable power source, such as a battery.

Fixed power sources are advantageous in that they are able to drive larger loads, such as Roman shades, without the worry of the power source being depleted or draining. However, one drawback of fixed power sources is that they require connection to the internal electrical wiring of the dwelling, which can lead to higher installation costs and/or more difficult installations as running additional wires may be required.

Replaceable power sources are advantageous in that they may be installed coincident with the shade without the constraint of having to access a fixed power source. However, these replaceable power sources may drain quickly when opening and/or closing larger (e.g., heavier) loads, such as Roman shades that have large amounts of heavy fabric and require varied amounts of power based on the position of the shade.

SUMMARY

As disclosed herein, a shade system (e.g., a Roman shade system) may comprise first and second brackets for mounting the shade system to a structure, a roller tube rotatably supported by the first and second brackets, and a housing configured to receive, at a first end of the housing, one or more batteries for powering a motor drive unit inside the roller tube. The housing may also be configured to support a lift assistance subsystem at a second end of the housing. The lift assistance subsystem is configured to provide variable lift assistance to the motor drive unit. The shade system may also comprise a battery holder for holding the one or more batteries. For example, the housing may comprise an internal compartment for housing the battery holder and the lift assistance subsystem. The lift assistance subsystem may comprise, for example, a lift assistance spring (e.g., a variable force spring) having a negative gradient force profile. In addition, the lift assistance subsystem may comprise a lift assistance spring (e.g., a constant force spring) having a constant force profile and a transmission that causes the lift assistance subsystem to be characterized with a negative gradient force profile.

In addition, the shade system may comprise a gear assembly configured to mechanically couple the roller tube to the lift assistance subsystem. For example, the gear assembly may comprise a first gear coupled to the roller tube, a second gear coupled to the lift assistance subsystem, and a third gear configured to engage the first and second gears. The shade system may comprise an idler assembly including a stationary portion configured to be attached to the second bracket and a rotatable portion configured to be attached to the roller tube and to rotate about the stationary portion as the roller tube rotates. The first gear may be connected to the rotatable portion of the idler assembly. In addition, the gear assembly may comprise a first gear engaged with a second gear, where the first gear is coupled to the roller tube and the second gear is coupled to the lift assistance subsystem.

Further, the shade system may comprise a shade fabric (e.g., Roman shade fabric) having a top end adapted to be fixedly connected adjacent to the housing and a bottom end adapted to move between a first position and a second position. The shade fabric may be coupled to the roller tube by a plurality of cords that wind and unwind around the roller tube as the shade fabric is moves between the first position and the second position. For example, the cords may be wrapped around the roller tube between respective pairs of collars that wrap around the roller tube. In addition, the cords may be received in grooves of respective spools on the roller tube.

DETAILED DESCRIPTION

Figure 1:
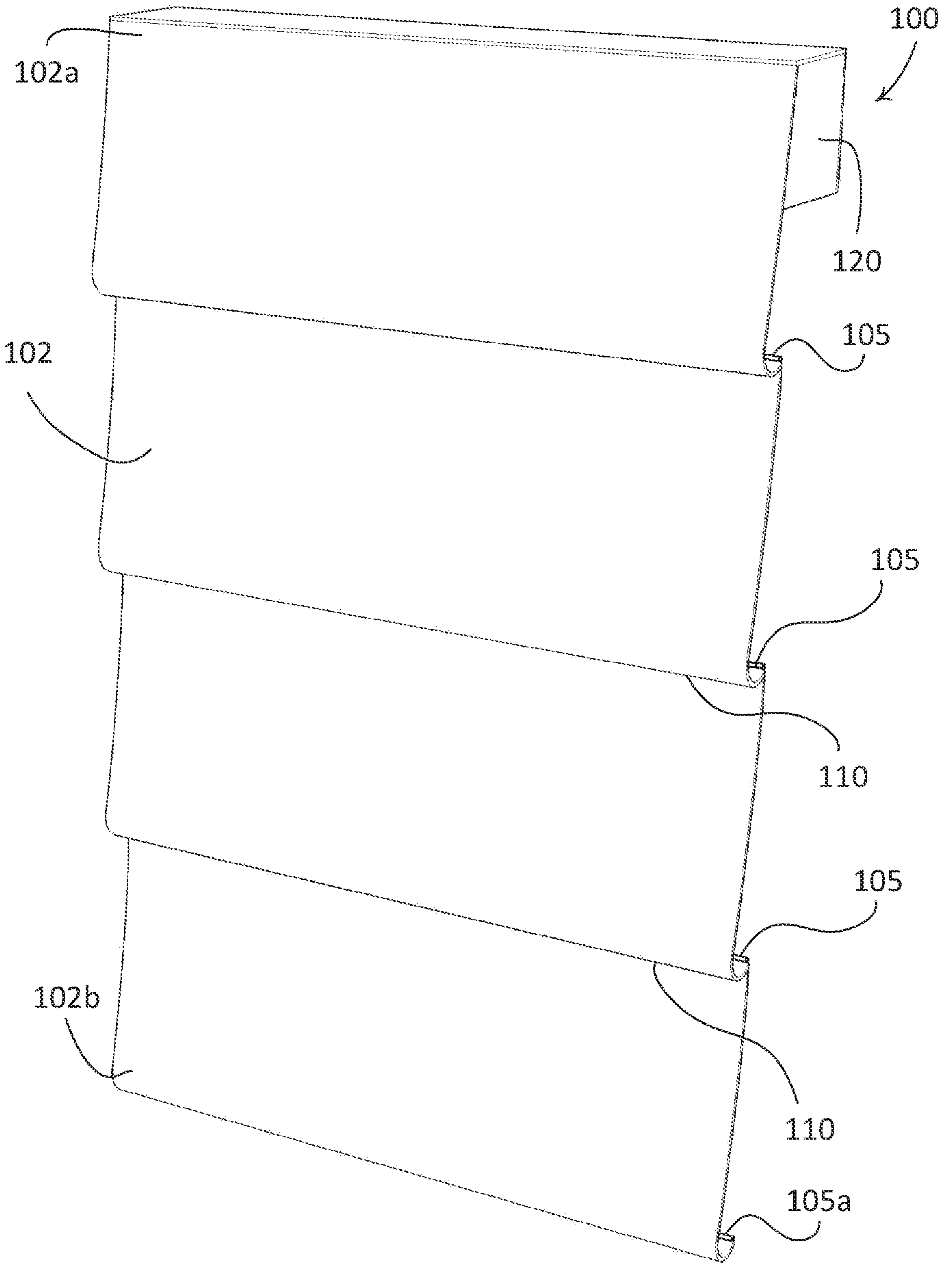
FIG. 1 is a front perspective view of a Roman shade system in a fully-lowered position.

The foregoing summary, as well as the following detailed description, is better understood when read in conjunction with the appended drawings. For the purposes of illustration, there is shown in the drawings several examples, in which like numerals represent similar parts throughout the several views of the drawings.

Figure 2:
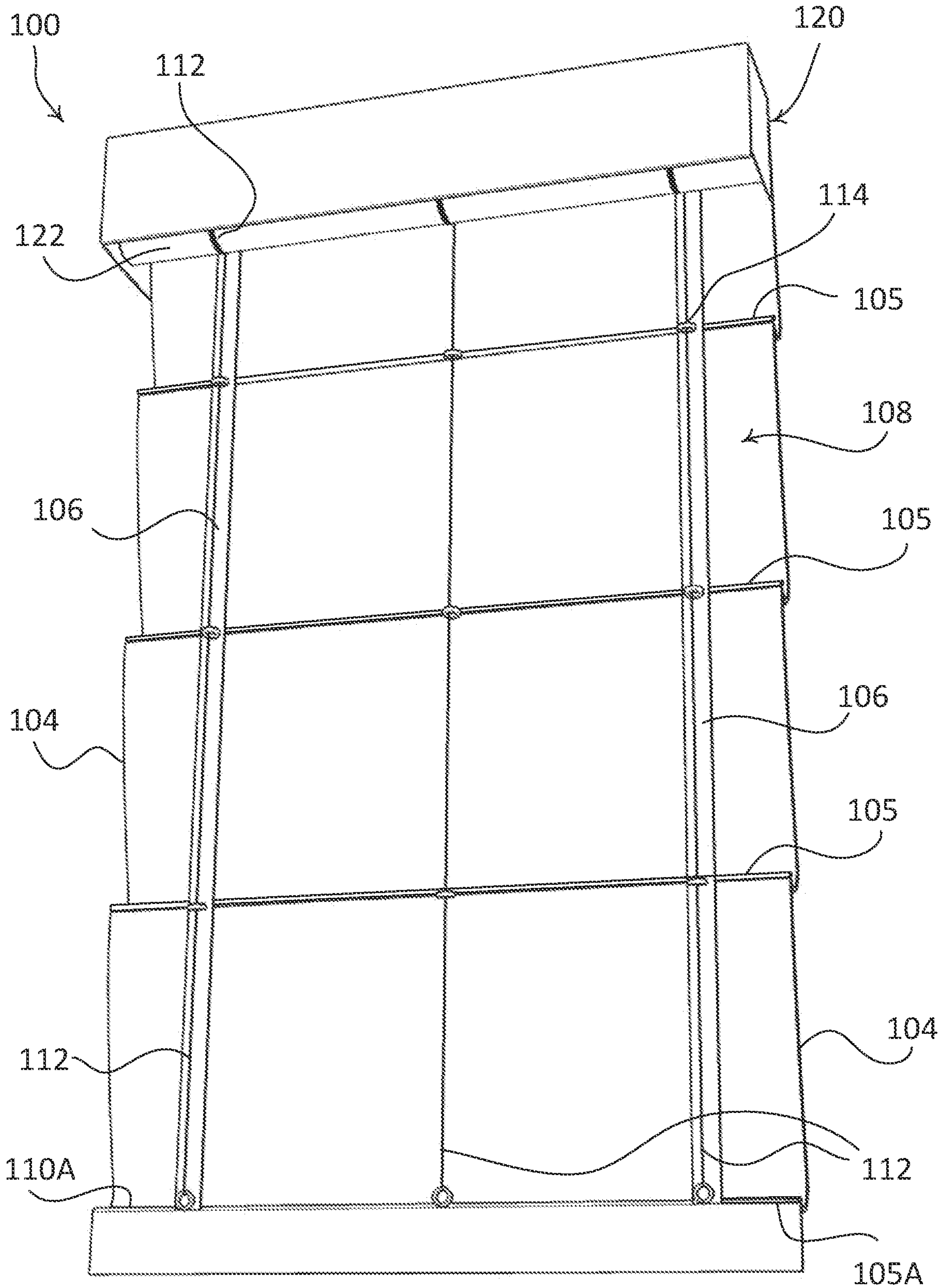
FIG. 2 is a rear perspective view of the Roman shade system of FIG. 1 in the fully-lowered position.
Figure 3:
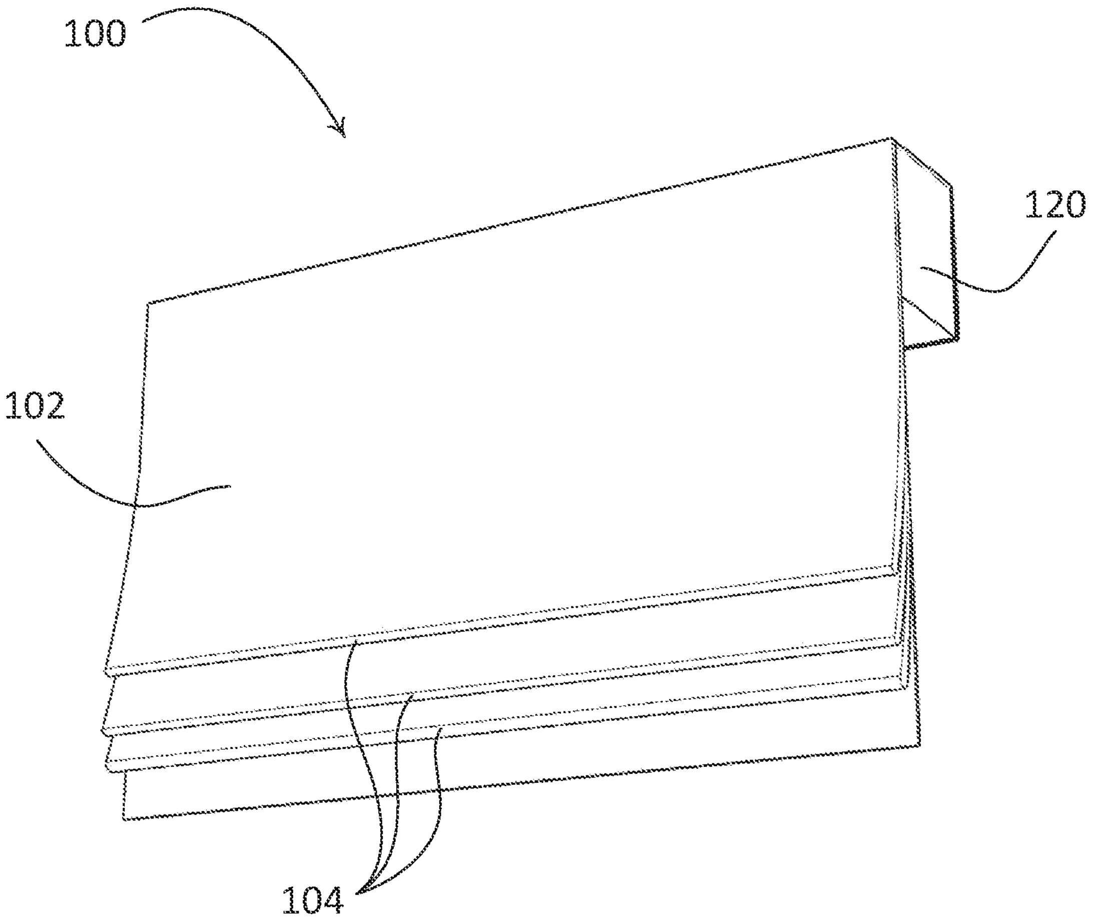
FIG. 3 is a front perspective view of the Roman shade system of FIG. 1 in a fully-raised position.

FIG. 1 is a front perspective view and FIG. 2 is a rear perspective view of a window treatment system, such as a Roman shade system 100, in a fully-lowered position (e.g., a closed position and/or a fully-closed position). FIG. 3 is a front perspective view of the Roman shade system 100 in a fully-raised position (e.g., an open position and/or a fully-open position). The Roman shade system 100 may include a shade fabric 102 (e.g., a hobbled shade fabric) that may be adapted to fold into a plurality of pleats 104 (e.g., horizontal pleats) as the Roman shade system 100 is opened. The pleats 104 may be formed by rigid battens 105 (e.g., dowels), which are sewn into the shade fabric 102 and extend horizontally across the width of the shade fabric. The Roman shade system 100 may comprise two or more ribbons 106 that extend along the length of a rear surface 108 of the shade fabric 102 and are attached to the rear surface 108 of the shade fabric 102 at the battens. Accordingly, the shade fabric 102 (e.g., the hobbled shade fabric) may hang with a plurality of folds 110 when the Roman shade system 100 is in the fully-lowered position as shown in FIGS. 1 and 2. As best seen in FIG. 2, multiple cords 112 (e.g., three cords) may be attached to a lowest one 105*a* of the battens 105 and pass through a plurality of eyelets 114 (e.g., attachment points) that are coupled to the rear surface 108 of the shade fabric 102. The eyelets 114 may be coupled to the battens. Although three cords 112 are illustrated, it should be understood that fewer (e.g., two) or more cords may be used.

Figure 4:
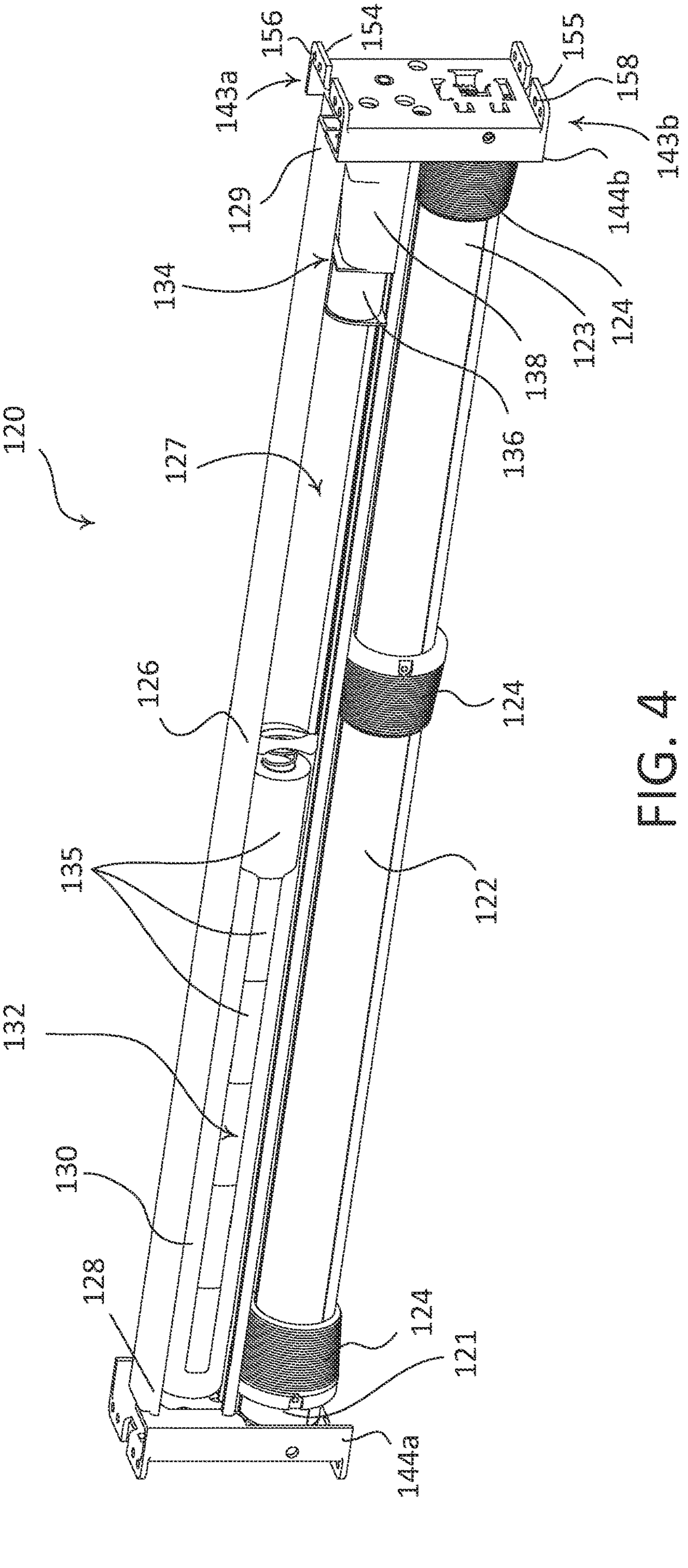
FIG. 4 is a perspective view of an example of a head rail assembly of the Roman shade system of FIG. 1.
Figure 5:
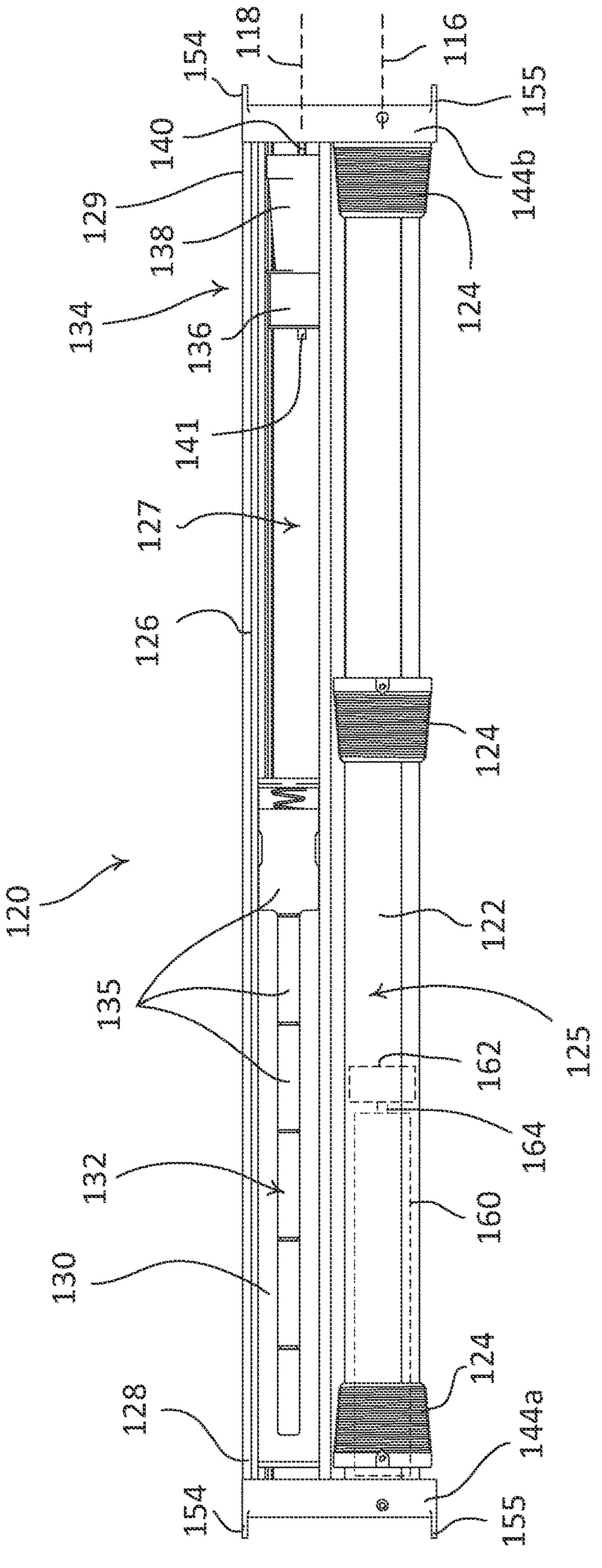
FIG. 5 is a front view of the head rail assembly of FIG. 3.

The Roman shade system 100 may comprise a head rail assembly 120. FIG. 4 is a perspective view and FIG. 5 is a front view of the head rail assembly 120. The head rail assembly 120 may comprise a roller tube 122 that may be configured to rotate about a first axis 116, which may be a longitudinal axis of the roller tube 122. The roller tube 122 may extend from a first end 121 to a second end 123. The shade fabric 102 (e.g., a top end 102*a* of the shade fabric 102) may be attached (e.g., fixedly attached) to the head rail assembly 120 and may be configured to hang from the head rail assembly 120 (e.g., as shown in FIGS. 1-3). The cords 112 may be coupled to the head rail assembly 120. More specifically, the cords 112 may be coupled to the roller tube 122 of the head rail assembly 120. The cords 112 may be configured to wrap around the roller tube 122 and a bottom end 102*b* of the shade fabric 102 may be configured to move as the roller tube 122 rotates. In some examples, the cords 112 may be configured to wrap around cord spools 124 as the roller tube 122 rotates. In some other examples, the cords 112 may be guided by a pair of spaced-apart collars that wrap around the roller tube 122 (e.g., such as collars 216 shown in FIGS. 12-16). It should be understood that rather than using the cords 112, the Roman shade system 100 may use a ribbon having a narrow width (e.g., approximately ¼ inch or less) or one or more lift bands as described in U.S. Patent Application Publication No. 2010/0294438, published Nov. 25, 2010, entitled ROMAN SHADE SYSTEM, the entire disclosure of which is hereby incorporated by reference.

Figure 6:
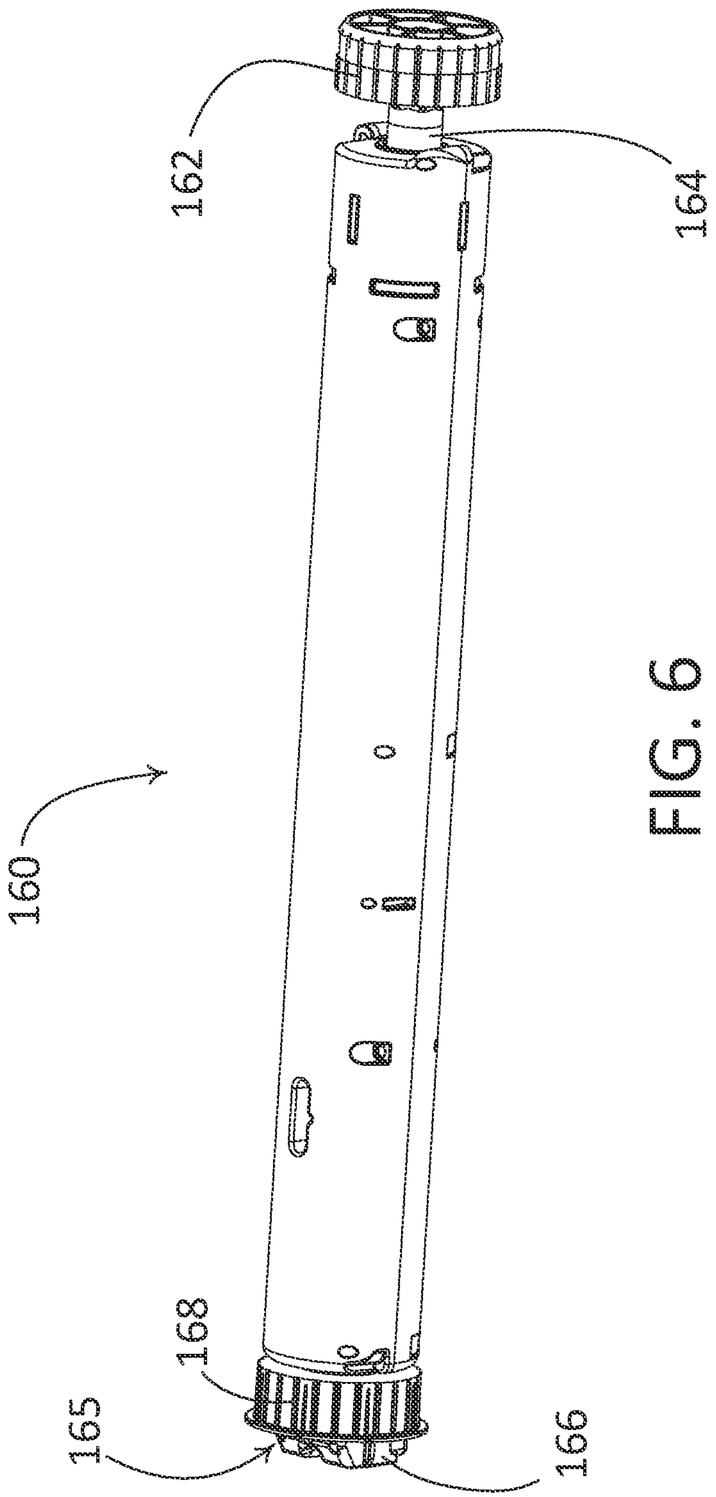
FIG. 6 is a perspective view of an example motor drive unit for the head rail assembly of FIG. 4.

The roller tube 122 may be hollow such that the roller tube 122 defines an internal cavity 125 sized and configured to receive a motor drive unit 160 (e.g., a motor drive assembly) as shown in FIG. 5. For example, the position of the motor drive unit 160 in the roller tube 122 may be illustrated by a dashed line in FIG. 5. The motor drive unit 160 may be received in the first end 121 of the roller tube 122. One example of a motor drive unit is disclosed in U.S. Pat. No. 6,983,783, issued Jan. 10, 2006, entitled MOTORIZED SHADE CONTROL SYSTEM, the entire disclosure of which is hereby incorporated by reference. FIG. 6 is a perspective view of an example motor drive unit, such as the motor drive unit 160, removed from the roller tube 122. The motor drive unit 160 may include an internal motor (not shown) that may be coupled to a drive coupler 162 via a drive shaft 164 for rotatably driving the drive coupler 162. The drive coupler 162 may be notched about its outer periphery to facilitate engagement between the drive coupler 162 and an interior surface of the roller tube 122 in which the motor drive unit 160 is received. The motor drive unit 160 may further comprise an end portion 165 having a connector 166, such as a male or female connector, for connecting the motor drive unit 160 to a power source, such as one or more batteries 135 (e.g., as will be described in greater detail below). The motor drive unit 160 may comprise a bearing assembly 168, which may be rotatably coupled to the roller tube 122 at the first end 121 of the roller tube (e.g., to allow the roller tube to rotate relative to first bracket 144*a*). The second end 123 of the roller tube 122 may receive an idler assembly 170 (FIGS. 10 and 11), which may also be rotatably coupled to the roller tube 122 (e.g., to allow the roller tube to rotate relative to second bracket 144*b*).

The head rail assembly 120 may further include a housing 126 (e.g., an elongated housing or body), which extends from a first end 128 to a second end 129. As shown in FIGS. 4 and 5, the head rail assembly 120 may include a first bracket 144*a* and a second bracket 144*a*. The first and second brackets 144*a*, 144*b* may also include couplings, such as holes, recesses, detents, projections, and other physical constructions that facilitate coupling the first and second brackets 144*a*, 144*b* to the housing 126 of the head rail assembly 120, either directly or indirectly. The roller tube 122 may be rotatably supported by the first and second brackets 144*a*, 144*b*. The first bracket 144*a* may be coupled to the end portion 165 of the motor drive unit 160 and the second bracket 144*b* may be coupled to the idler assembly 170 to support (e.g., rotatably support) the roller tube 122.

The housing 126 of the head rail assembly 120 may be coupled to the first and second brackets 144*a*, 144*b* for mounting the Roman shade system 100 to a structure (e.g., a wall, a ceiling, a window frame, or other structure to which the Roman shade system 100 is to be coupled). For example, the first and second brackets 144*a*, 144*b* may each include a first flange 154 defining holes 156 at a first end 143*a* of the respective bracket 144*a*, 144*b* and a second flange 155 defining holes 158 at a second end 143*b* of the respective bracket 144*a*, 144*b*. The holes 156, 158 may be sized and configured to receive fasteners (e.g., screws) for coupling the first and second brackets 144*a*, 144*b* to the structure. Providing the first flanges 154 and the second flanges 155 on the first and second brackets 144*a*, 144*b* enables either of the first and second ends 143*a*, 143*b* of the first and second brackets 144*a*, 144*b* to be connected to the structure to which the head rail assembly 120 is mounted, such that the housing 126 is disposed above the roller tube 122, or such that the roller tube 122 is disposed above the housing 126. This is advantageous in that it enables the same head rail assembly 120 to be used in both front-control configurations, e.g., configurations in which the cords 112 come out of the rear of the head rail assembly 120 (e.g., toward the window, wall, etc.), and rear-control configurations, e.g., configurations in which the cords 112 come out of the front of the head rail assembly 120 (e.g., away from the window, wall, etc.).

The housing 126 may include a battery holder 130 that may define a battery compartment 132 sized and configured to receive the one or more batteries 135 for powering the motor drive unit 160. For example, the housing 126 may define an internal compartment 127 that is sized and configured to receive the battery holder 130. The number and type of batteries 135 that may be received in the battery compartment 132 of the battery holder 130 may be based on the type of window treatment system that will be supported. In some examples, the battery compartment 132 of the battery holder 130 may be sized and configured to receive five D-cell batteries, although one of ordinary skill in the art will understand that a different number and type (e.g., size and/or capacity) of batteries may be used depending on the power needs for a particular system. For example, while five D-cell batteries are referenced, one of ordinary skill in the art will understand that fewer (e.g., 1-4) or more batteries may be used. Additionally or alternatively, other types of batteries (e.g., A, AA, AAA, and/or lithium-ion batteries) may be used instead of D-cell batteries. The battery holder 130 may be electrically coupled to the motor drive unit 160 via one or more electrical wires for allowing the batteries 135 to power the motor drive unit 160. As shown in FIG. 4, the battery holder 130 may be disposed at or adjacent to the first end 128 of the housing 126. Locating the motor drive unit 160 in the first end 121 of the roller tube 122 and the battery holder 130 adjacent to the first end 128 of the housing 126 may enable the connector 166 to be electrically connected to the motor drive unit 160 and to allow associated wires between the motor drive unit 160 and the battery holder 130 to be made as short as possible.

Figure 7:
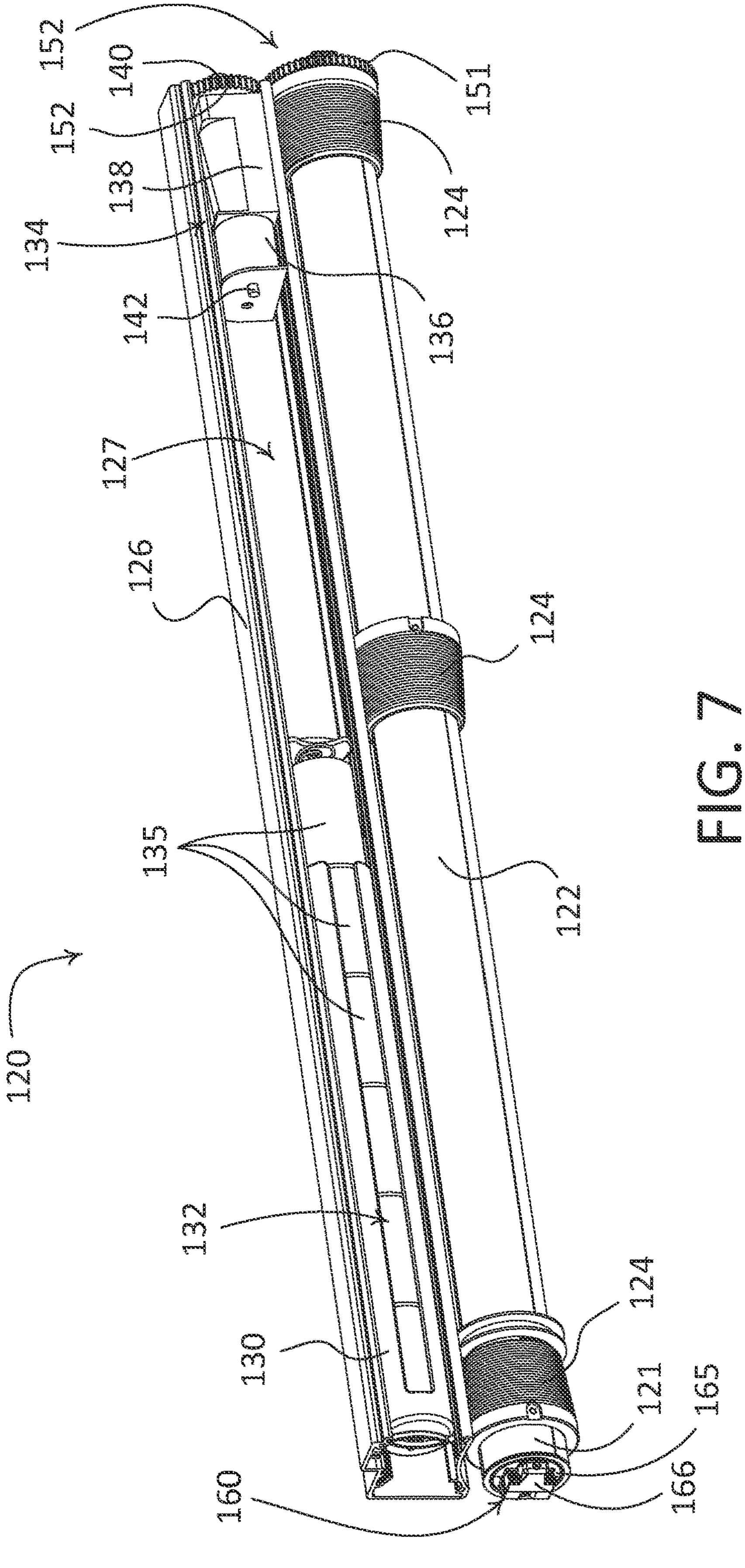
FIG. 7 is a perspective view of the head rail assembly of in FIG. 4 when a lift assistance subsystem of the head rail assembly includes a lift assistance spring and a transmission.
Figure 8:
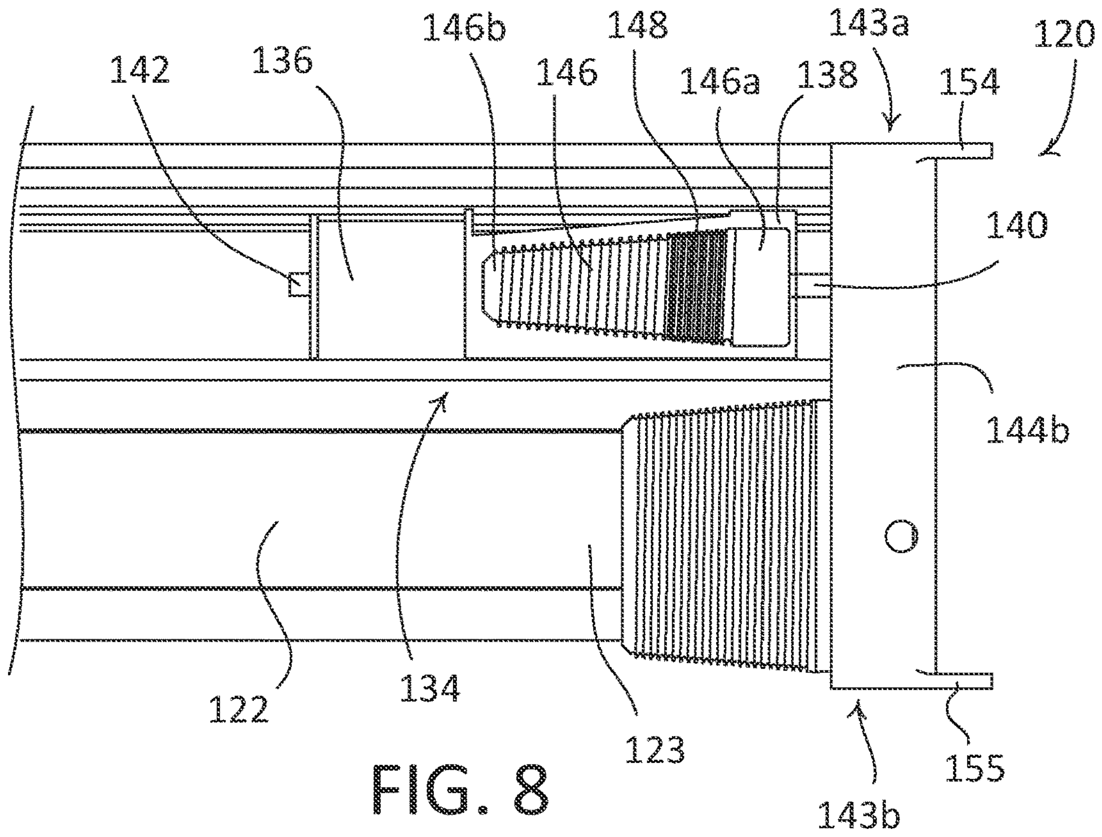
FIG. 8 is an enlarged view of the lift assistance subsystem of FIG. 7.

The head rail assembly 120 may also comprise a lift assistance subsystem 134, which may be housed and/or supported by the housing 126. For example, the internal compartment 127 of the housing 126 may also be sized and configured to receive the lift assistance subsystem 134. The lift assistance subsystem 134 may be configured to assist the motor drive unit 160 disposed in the cavity 125 of the roller tube 122 in moving the shade fabric 102 between first and second positions (e.g., fully-raised and fully-lowered positions). In some examples, such as when the shade fabric 102 is a Roman shade fabric, the lift assistance subsystem 134 may include a lift assistance spring 136 and a transmission 138. FIG. 7 is a perspective view of the head rail assembly 120 when the lift assistance subsystem 134 includes the lift assistance spring 136 and the transmission 138 (e.g., and with the first and second brackets 144*a*, 144*b* removed). FIG. 8 is an enlarged view of the lift assistance subsystem 134. The lift assistance spring 136 may be a constant-force spring that is coupled to a shaft 142 (e.g., an axle). It should be understood that other types of lift assistance springs may be used, including variable force springs.

The head rail assembly 120 may comprise a gear assembly 150 that may mechanically couple the roller tube 122 to the lift assistance subsystem 134 (e.g., as shown in FIG. 7). For example, the gear assembly 150 may comprise a first gear 151 and a second gear 153. The first gear 151 may be coupled to the roller tube 122 (e.g., to the idler assembly 170 at the second end 123 of the roller tube 122), such that the first gear 151 is also configured to rotate about the first axis 116. The transmission 138 of the lift assistance subsystem 134 may be coupled to a shaft 140 (e.g., an axle). The second gear 152 may be coupled to the shaft 140. The transmission 138 may also be coupled to the shaft 142 that is coupled to the lift assistance spring 136, such that the transmission 138 may be configured to adjust the amount of assistance (e.g., force) that is provided by the lift assistance subsystem 134 on the roller tube 122.

Figure 9:
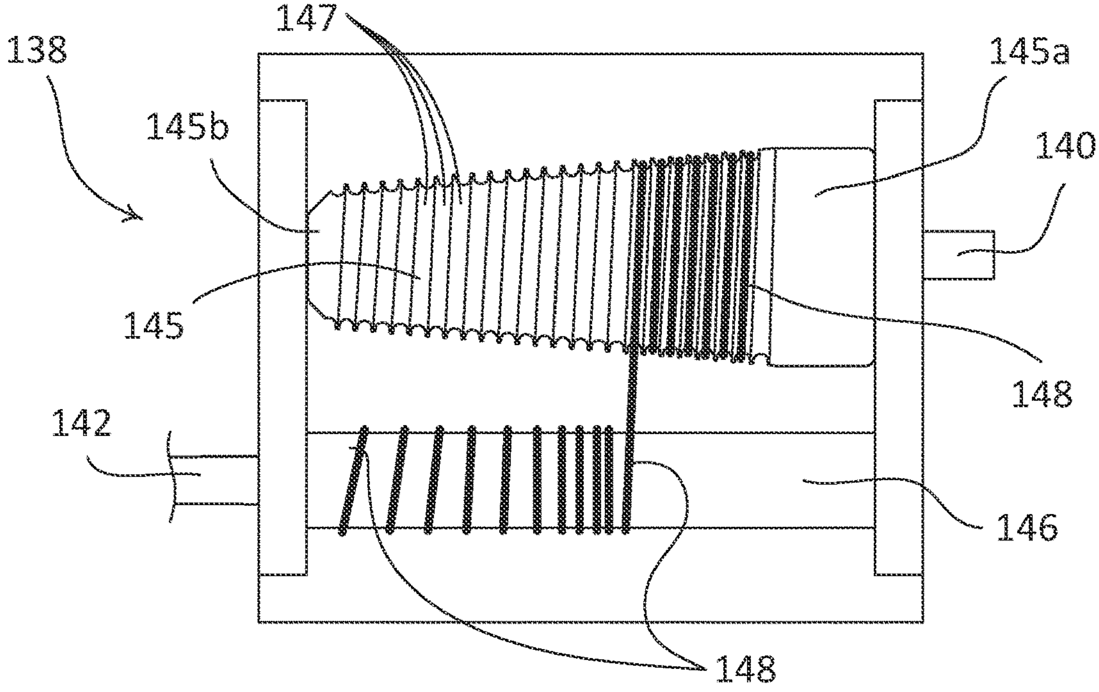
FIG. 9 is an enlarged view of the transmission of the lift assistance subsystem of FIG. 7.

FIG. 9 illustrates an example of the transmission 138. The transmission 138 may include one or more spools, such as first and second spools 145, 146, and a cord 148 (e.g., a wire) that may be wrapped around the first and second spools 145, 146, such that rotation of the first spool 145 results in rotation of the second spool 146. In the example illustrated in FIG. 9, the cord 148 is received in grooves 147 defined by the first spool 145. As shown in FIG. 9, the first spool 145 may be coupled to the shaft 140, which is coupled to the second gear 152. The second gear 152 may be coupled to the shaft 140 via press fit and/or using one or more fasteners (e.g., a retaining ring, Cotter pin, to list only a few possibilities) or collars as will be understood by one of ordinary skill in the art. The second gear 152 may be configured to rotate about a second axis 118. The second spool 146 may be coupled to the shaft 142 that is coupled to the lift assistance spring 136.

The first and second spools 145, 146 may have different diameters and/or different diameters with respect to length. For example, the second spool 146 may have a substantially constant diameter along its length (e.g., the first spool may have a cylindrical shape). The first spool 145 may have a variable diameter (e.g., taper in its circumference) along its length, such that one end 145A of the second spool 146 may have a greater diameter than the other end 145B of the first spool 145 (e.g., the first spool 145 may have a conical shape). As a result of the different diameters of the first and second spools 145, 146 with respect to length, the transmission 138 may allow the light assistance system 134 to provide a varying amount of assistance to the shaft 140 (e.g., to the second gear 152). As will be understood by one of ordinary skill in the art, the amount of assistance is varied as the cord 148 is being unwound from the first spool 145, and wound around the second spool 146, and vice versa due to the unequal diameters of the spools 145, 146. The lift assistance spring 136 may be a constant force spring, such that the lift assistance spring 136 in combination with the transmission 138 may provide greater assistance (e.g., a greater force) when the shade fabric 102 is near the fully-raised position compared than when the shade fabric 102 is near the fully-lowered position (e.g., as there is less torque required to move the roller tube 122 when the shade fabric 102 is near the fully-lowered position compared to when the shade fabric 102 is near the fully-raised position). In some example, the first spool 145 may have a substantially constant diameter along its length, and the second spool 146 may have a variable diameter along its length. In other examples, the first and second spools 145, 146 may each have a variable diameter along the length of the respective spool.

Figure 10:
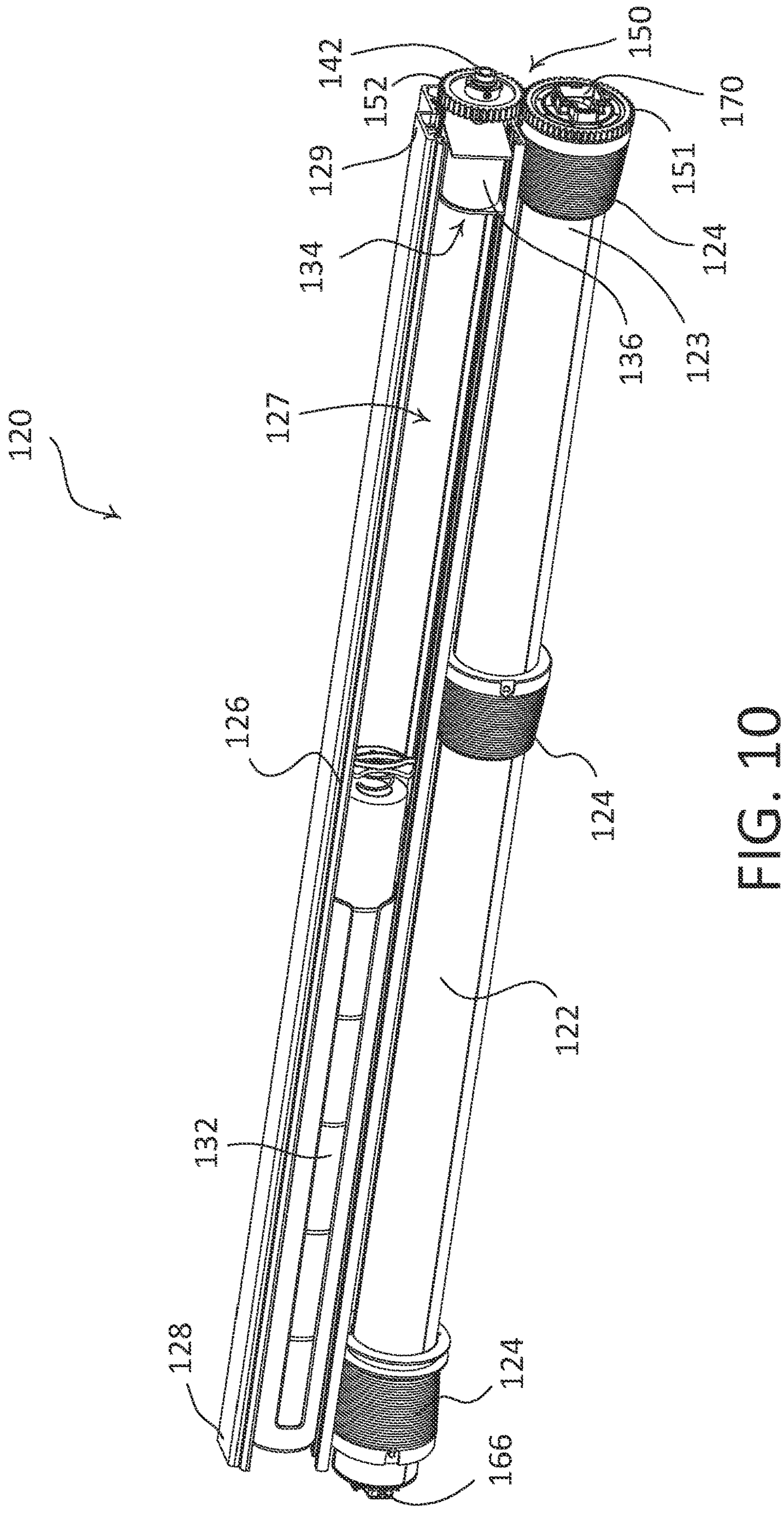
FIG. 10 is a perspective view of head rail assembly of FIG. 4 when a lifts assistance subsystem of the head rail assembly only includes a lift assistance spring.

In some examples, the lift assistance subsystem 134 may only include a lift assistance spring 136 disposed on the shaft 140, which is coupled to the second gear 152. FIG. 10 is a perspective view of the head rail assembly 120 when the lift assistance subsystem 134 includes only the lift assistance spring 136 (e.g., and with the first and second brackets 144*a*, 144*b* removed). When the lift assistance subsystem 134 does not include the transmission 138, the lift assistance spring 136 may be a variable force spring (e.g., also referred to as "V-springs"), such as a negative-gradient spring, which may have a negative gradient force profile (e.g., decreasing load with increasing deflection). The negative-gradient spring may provide greater assistance (e.g., a greater force) when the shade fabric 102 is near the fully-raised position compared to when the shade fabric 102 is near the fully-lowered position (e.g., as there is less torque required to move the roller tube 122 when the shade fabric 102 is near the fully-lowered position compared to when the shade fabric 102 is near the fully-raised position).

In some examples, the housing 126 may comprise a first internal compartment (not shown) at the first end 128 and a second internal compartment (not shown) at the second end 129. The first internal compartment at the first end 128 may be sized and configured to house the battery holder 130 and the second internal compartment at the second end 129 may be sized and configured to receive the lift assistance subsystem 134. In some examples, the lift assistance subsystem 134 may comprise multiple lift assistance springs (e.g., such as the lift assistance spring 136) coupled together to provide additional assistance.

Figure 11:
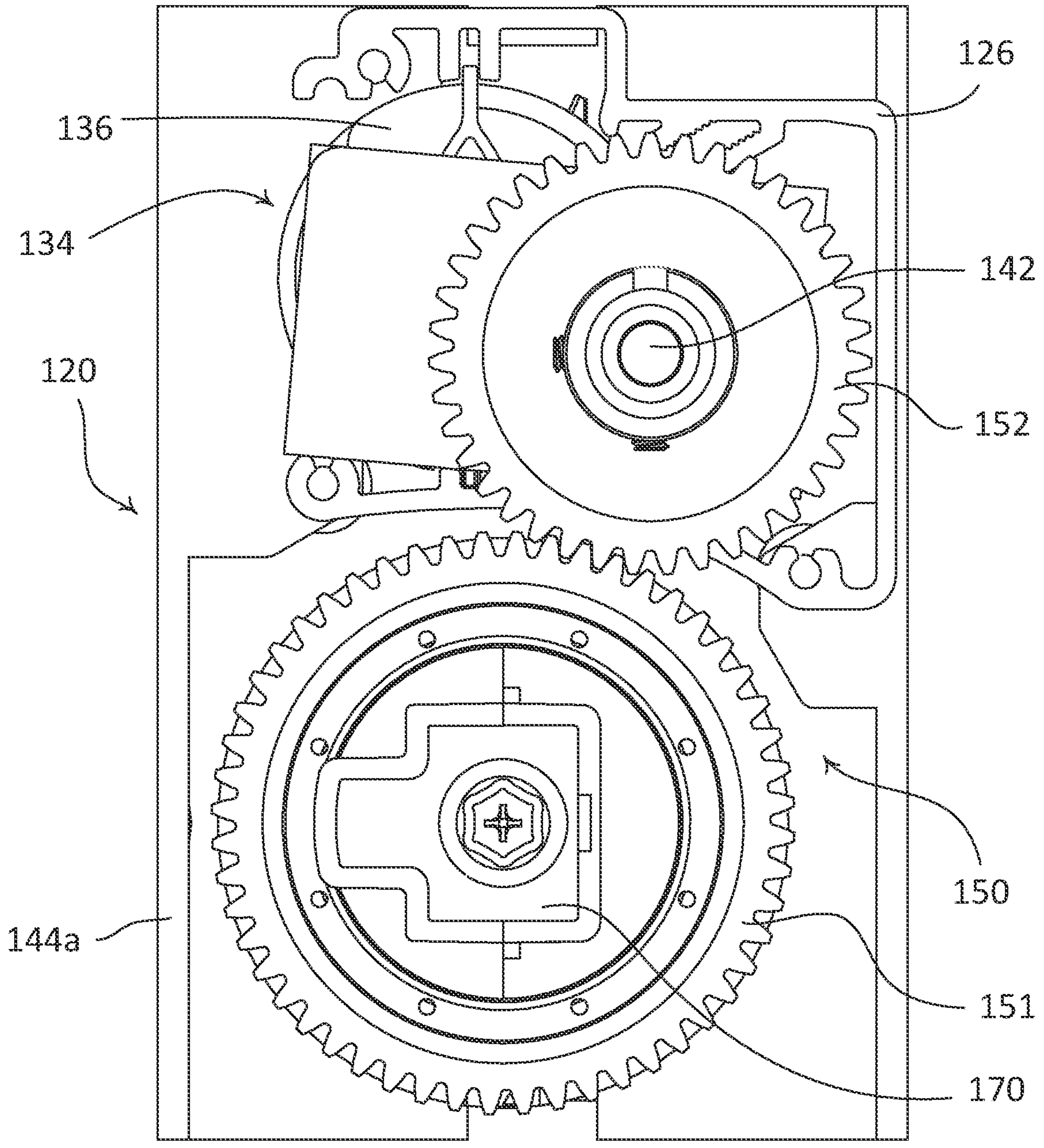
FIG. 11 is a right-side view of the head rail assembly of FIG. 4.

FIG. 11 is a right-side view of the head rail assembly 120 with the second bracket 144*b* removed to illustrate the gear assembly 150. For example, the lift assistance subsystem 134 may include only the lift assistance spring 136 as shown in FIG. 11. The second gear 152 that is coupled to the lift assistance subsystem 134 may be engaged with the first gear 151 that is coupled to the roller tube 122 (e.g., the second end 123 of the roller tube 122). The engagement between the second gear 152 coupled to the lift assistance subsystem 134 (e.g., that rotates about the second axis 118) and the first gear 151 coupled to the second end 123 of the roller tube 122 (e.g., that rotates about the first axis 116) may provide the connection through which the lift assistance subsystem 134 provides the assistance to the motor of the motor drive unit 160 in moving the window covering (e.g., the shade fabric 102). For example, the second bracket 144*b* may support (e.g., contain) the first gear 151 that is coupled to the roller tube 122 and the second gear 152 that is coupled to the lift assistance subsystem 134 disposed within the housing 126 of the head rail assembly 120.

In operation, the motor of the motor drive unit 160 may cause the drive shaft 164, which is coupled to the drive coupler 162, to rotate in either a first direction (e.g., clockwise) or a second direction (e.g., counterclockwise) depending on whether the shade fabric 102 is to be moved toward the fully-lowered position or toward the fully-raised position. The drive coupler 162 may be coupled to the roller tube 122 such that movement of the drive shaft 164 results in movement of the roller tube 122 about the first axis 116. As the roller tube 122 rotates, the cords 112 may either wound around the roller tube 122 (e.g., guided by the cord spools 124) or unwound from the roller tube 122 depending on the direction of the rotation. Since the cords 112 are wound around the roller tube 122, the cords 112 may pull on the battens 105 to cause the shade fabric 102 to raise and fold as the roller tube 122 rotates. For example, when starting in the fully-lowered position, rotation of the roller tube 122 may cause the cords 112 to wind around the roller tube 122, which may result in the lowest one 105A of the battens 105 (e.g., along with the shade fabric 102) being pulled in an upward direction. When the lowest one 105A of the battens 105 contacts the next highest batten, both the lowest one 105A of the battens 105 and the next highest batten may move together in an upward direction. Lowering of the shade fabric 102 reverses the operation. For example, all of the battens 105 may move together until one of the pleats 104 is fully expanded at which point the upper-most one of the battens 105 may stop moving (e.g., due to its engagement with the shade fabric 102) and the remainder of the lower battens 105 may continue to move in a downward direction until all of the battens 105 reach their respective lowest position.

As discussed above, the lift assistance subsystem 134 may provide variable assistance that is based on the position of the shade fabric 102. The lift assistance subsystem 136 may be coupled to the roller tube 122 via the first and second gears 151, 152 of the gear assembly 150. For example, when the lift assistance subsystem 134 includes the lift assistance spring 136 and the transmission 138, the lift assistance spring 136 may provide a constant force and the transmission 138 may vary the amount of force that is transmitted to the gear assembly 150 (e.g., and thus to the roller tube 122) to provide greater assistance (e.g., a greater force) when the shade fabric 102 is near the fully-raised position compared than when the shade fabric 102 is near the fully-lowered position (e.g., as there is less torque required to move the roller tube 122 when the shade fabric 102 is near the fully-lowered position compared to when the shade fabric 102 is near the fully-raised position). When the lift assistance spring 136 of the lift assistance subsystem 134 is a variable force spring (e.g., a negative gradient spring), the transmission 138 may be omitted and the lift assistance subsystem 134 may still provide variable assistance depending on the position of the shade fabric 102. The second gear 152 of the gear assembly 150 may be coupled to the shaft 140 (e.g., when the transmission 138 is included) or to the shaft 142 (e.g., when the transmission 138 is not included). The first gear 151 of the gear assembly 150 may be coupled to the roller tube 122. Rotation of the roller tube 122 may cause the shaft 140 or the shaft 142 to rotate (e.g., via the gear assembly 150). The lift assistance subsystem 136 may apply a variable force (e.g., with a negative gradient force profile) on the shaft 140 or the shaft 142 to provide assistance to the roller tube 122 for lifting the shade fabric 102.

Figure 12:
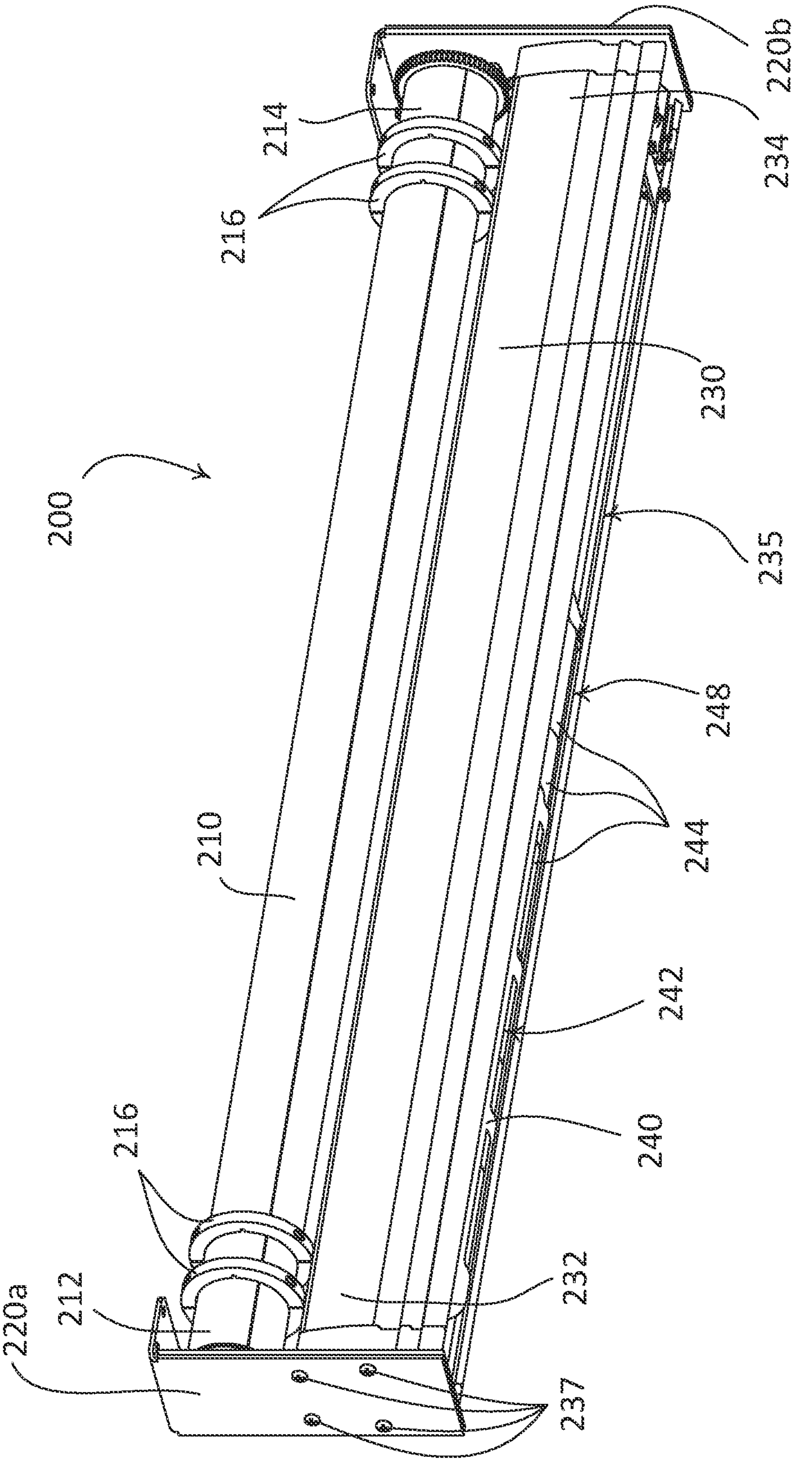
FIG. 12 is a perspective view of another example of a head rail assembly for the Roman shade system of FIG. 1.
Figure 13:
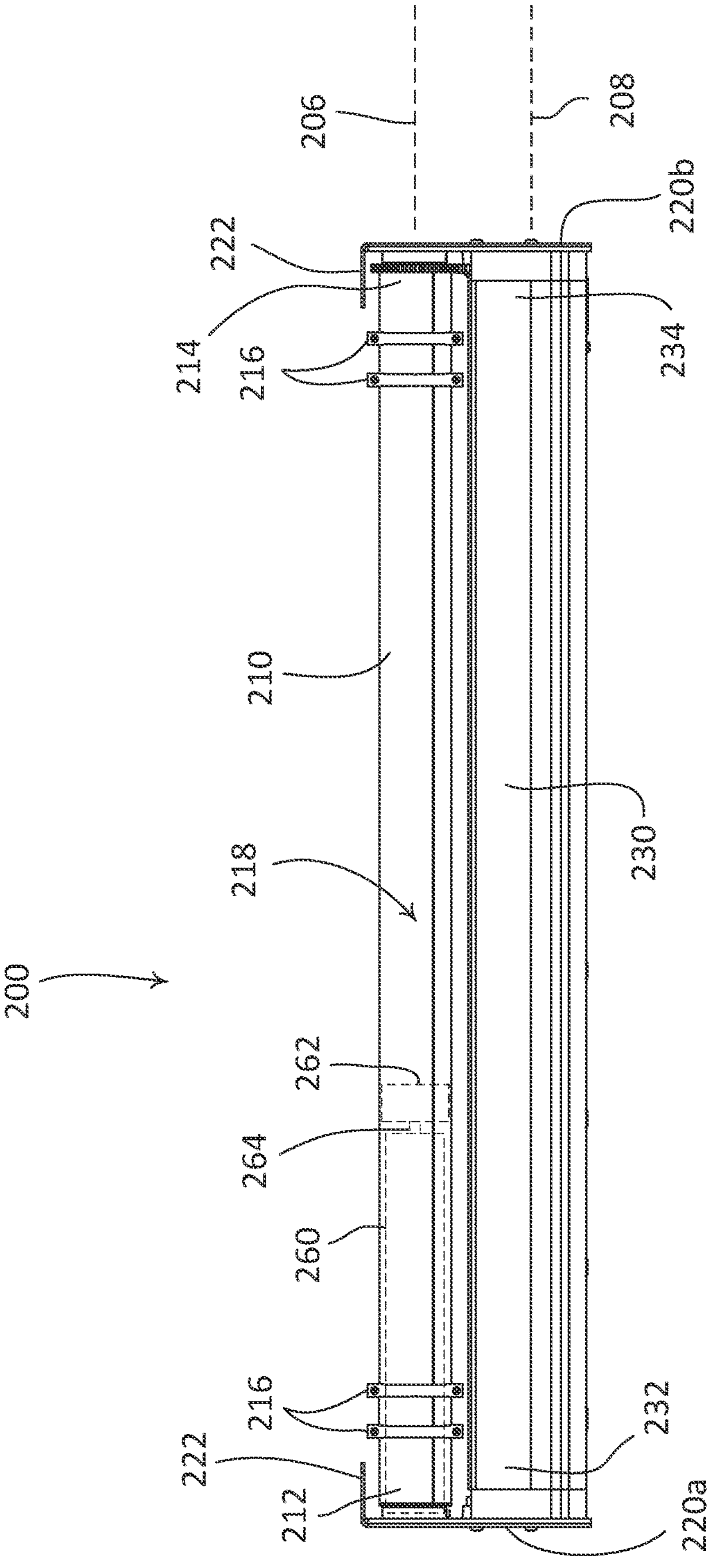
FIG. 13 is a front view of the head rail assembly of FIG. 12.
Figure 14:
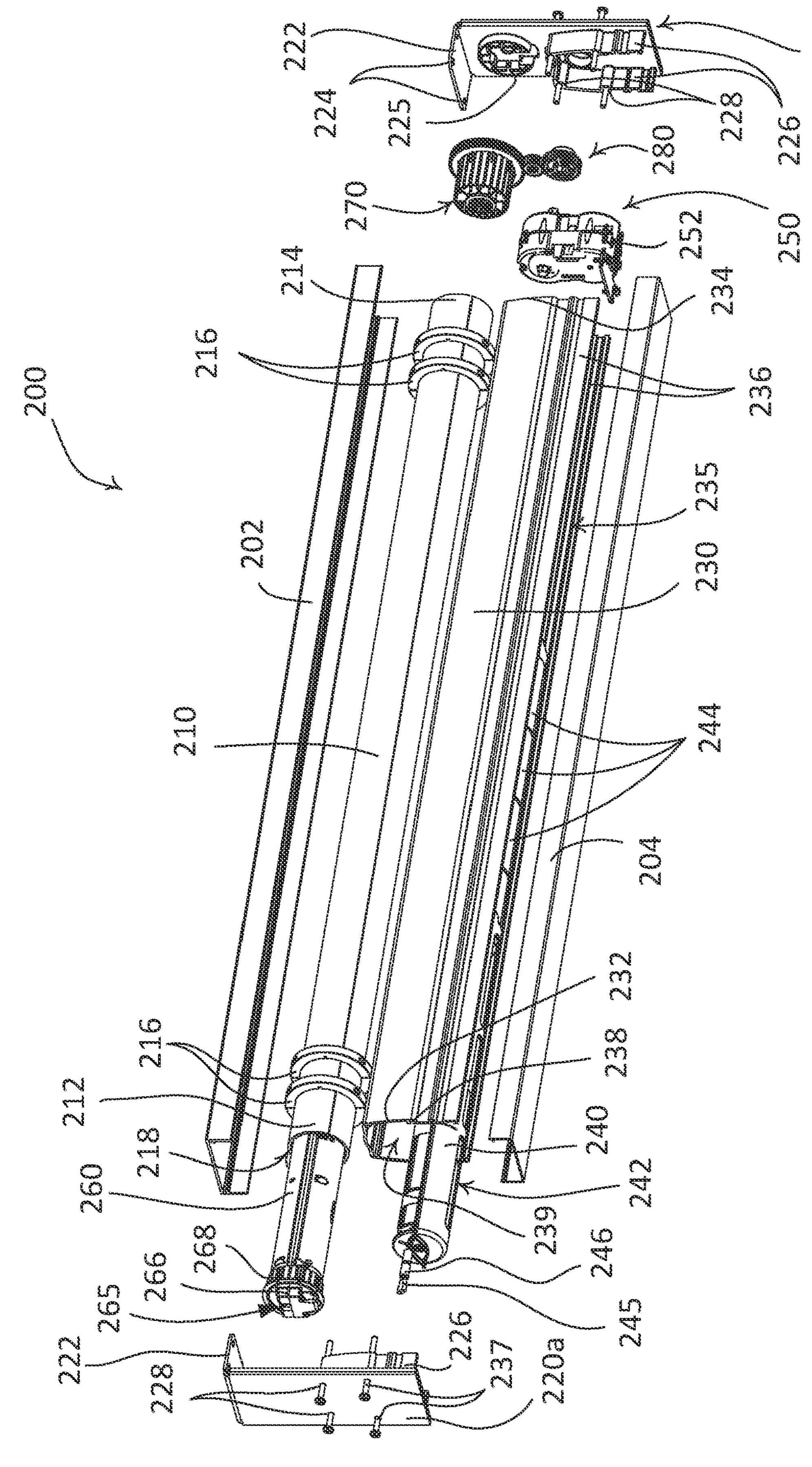
FIG. 14 is an exploded view of the head rail assembly of FIG. 12.

FIG. 12 is a perspective view and FIG. 13 is a front view of an example of a head rail assembly 200 that may be used in a window treatment system, such as a Roman shade system (e.g., the Roman shade system 100 shown in FIGS. 1-3). FIG. 14 is an exploded view of the head rail assembly 200. The Roman shade system may comprise a shade fabric (e.g., not shown in the figures but similar to the shade fabric 102) that may be attached to and configured to hang from the head rail assembly 200 (e.g., as shown in FIGS. 1-3). The head rail assembly 200 may comprise a roller tube 210 that may rotate about a first axis 206 and may extend from a first end 212 to a second end 214. The Roman shade system may comprise multiple cords (e.g., not shown in the figures but similar to the cords 112) that may be configured to wrap around the roller tube 210 as the roller tube 210 rotates for raising and lowering the shade fabric. In some examples, the cords may be guided by pairs of spaced-apart collars 216 that extend around the roller tube 210. While two pairs of collars 216 are shown, the roller tube 210 could comprise more than two pairs of collars 216 (e.g., depending on the number of cords required for the shade fabric). The pairs of collars 216 may be spaced apart from one another along the roller tube 210 and the cords may be wrapped around the roller tube 210 between the adjacent collars of each pair of collars 216 as the roller tube 210 rotates. In some examples, the cords may be configured to wrap around cord spools (e.g., similar to the spools 124 as shown in FIGS. 4 and 5) rather than between the collars 216 as the roller tube 210 rotates.

The roller tube 210 may be hollow such that the roller tube 210 defines an internal cavity 218 (e.g., a chamber) sized and configured to receive a motor drive unit 260 (e.g., similar to the motor drive unit 160 shown in FIG. 6). For example, the position of the motor drive unit 260 in the roller tube 210 may be illustrated by a dashed line in FIG. 13. The motor drive unit 260 may be received in the first end 212 of the roller tube 210. The motor drive unit 260 may include an internal motor (not shown) that may be coupled to a drive coupler 262 via a drive shaft 264 for rotatingly driving the drive coupler 262. The drive coupler 262 may be notched about its outer periphery to facilitate engagement between the drive coupler 262 and an interior surface of the roller tube 210 in which the motor drive unit 260 is received. The motor drive unit 260 may further comprise an end portion 265 having a connector 266, such as a male or female connector, for connecting the motor drive unit 260 to a power source, such as one or more batteries 244. The motor drive unit 260 may comprise a bearing assembly 268, which may be rotatably coupled to the roller tube 210 at the first end 212 of the roller tube 210. The second end 214 of the roller tube 210 may receive an idler assembly 270 (FIG. 14), which may be rotatably coupled to the roller tube 210 at the second end 214 of the roller tube 210.

The head rail assembly 200 may also include a first bracket 220*a* and a second bracket 220*b* for mounting the Roman shade system to a structure (e.g., a wall, a ceiling, a window frame, or other structure to which the Roman shade system is to be coupled). For example, the brackets 220*a*, 220*b* may each include a flange 222 defining holes 224. The holes 224 may be sized and configured to receive fasteners (e.g., screws) for coupling the brackets 220*a*, 220*b* to the structure. The first and second brackets 220*a*, 220*b* may be configured to support (e.g., rotatably support) the roller tube 210 (e.g., via a bearing assembly of the motor drive unit 260 and the idler assembly 270). The first bracket 220*a* may be coupled to the end portion 265 of the motor drive unit 260 and the second bracket 220*b* may be coupled to the idler assembly 270 to support (e.g., rotatably support) the roller tube 210. The first and second brackets 230*a*, 230*b* may comprise respective attachment structures for attaching to the end portion 265 of the motor drive unit 260 and the idler assembly 270, respectively. For example, the second bracket 230*b* may comprise an attachment structure 225 configured to attach to and support the idler assembly 270 (e.g., as shown in FIG. 14). The first bracket 230*a* may comprise a corresponding attachment structure (e.g., similar to the attachment structure 225 of the second bracket 230*b*) configured to attach to and support the end portion 265 of the motor drive unit 260.

Figure 15:
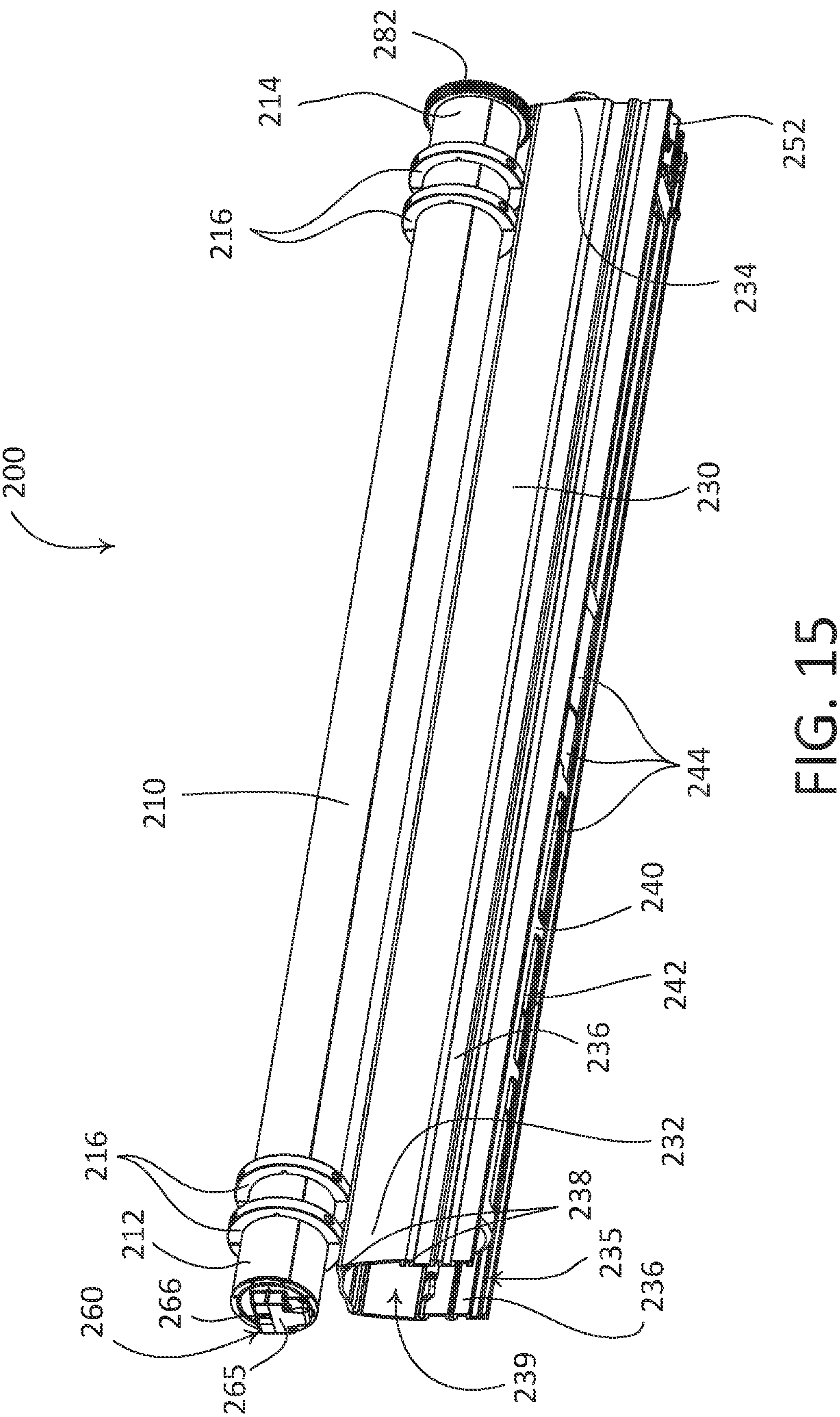
FIG. 15 is a left-side perspective view of the head rail assembly of FIG. 12 with brackets removed.
Figure 16:
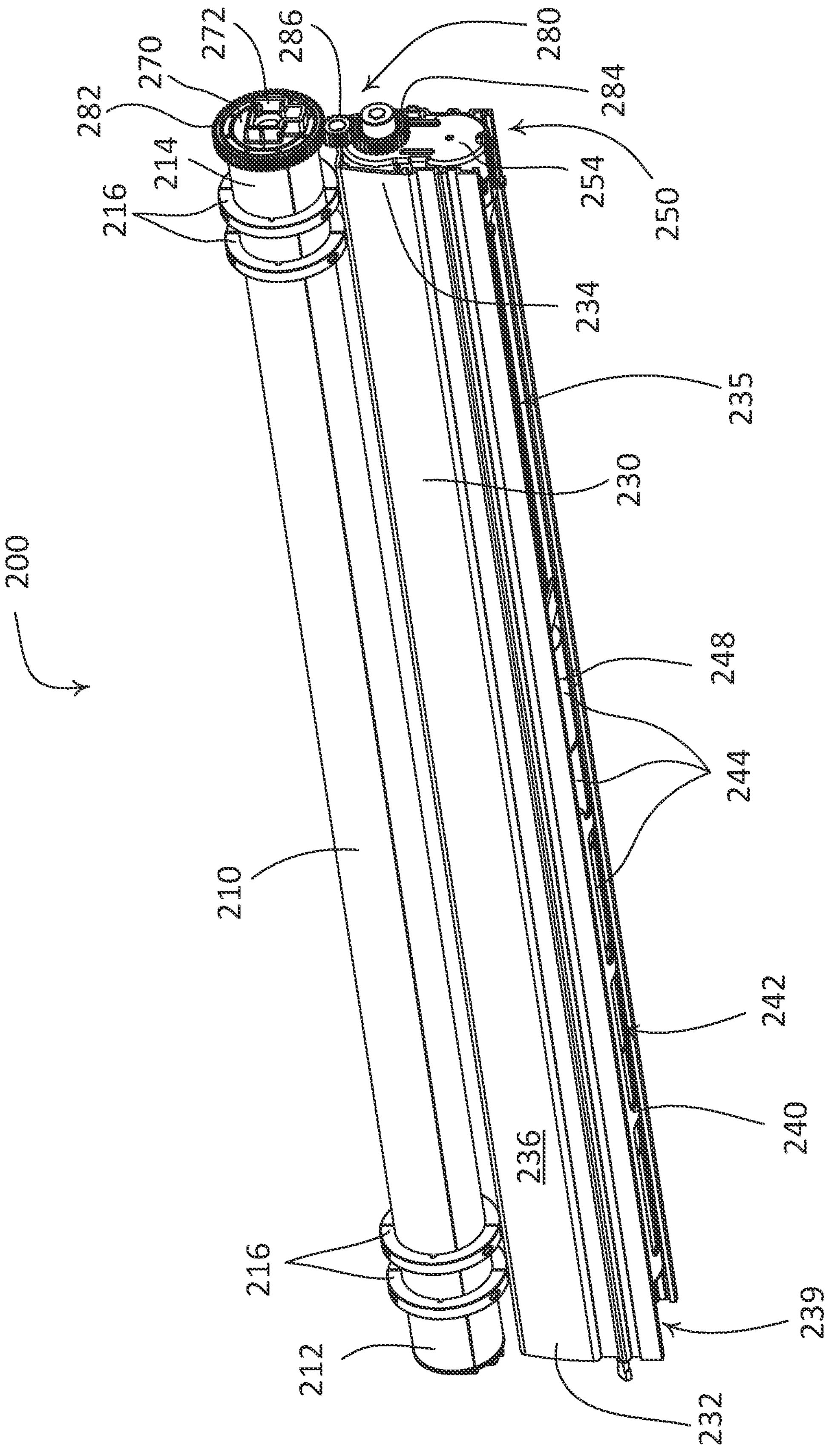
FIG. 16 is a right-side perspective view of the head rail assembly of FIG. 12 with brackets removed.

FIG. 15 is a left-side perspective view and FIG. 16 is a right-side perspective view of the head rail assembly 200 with the brackets 230*a*, 230*b* removed. The head rail assembly 200 may further include a housing 230 (e.g., an elongated housing or body), which extends from a first end 232 to a second end 234 (e.g., extends the length of the roller tube 210). The housing 230 may comprise sidewalls 236 that extend the length of the housing 230 from the first end 232 to the second end 234. The housing 230 may define an elongated slot 235 that may extend the length of the housing 230 from the first end 232 to the second end 234 (e.g., between the sidewalls 236 in a bottom of the housing 230). The first and second brackets 220*a*, 220*b* also may be configured to support (e.g., fixedly support) the housing 230. For example, the first and second brackets 220*a*, 220*b* may also include couplings, such as holes, recesses, detents, projections, and other physical constructions that facilitate coupling the first and second brackets 220*a*, 220*b* to the housing 230, either directly or indirectly. The first bracket 220*a* may be coupled to the first end 232 of the housing 230 and the second bracket 220*b* may be coupled to the second end 234 of the housing 230. The first and second brackets 220*a*, 220*b* may comprise walls 226 that line up with the sidewalls 236 of the housing 230. The housing 230 may be coupled to the first and second brackets 220*a*, 220*b* via fasteners 237 (e.g., screws) received in openings 228 in the first and second brackets 220*a*, 220*b* and openings 238 in the sidewalls 236 of the housing 230.

As shown in FIG. 14, the head rail assembly 200 may further comprise a top cover 202 configured to cover a top of the head rail assembly 200 and a bottom cover 204 configured to cover a bottom of the head rail assembly 200. The top cover 202 may extend the length of the head rail assembly 200 (e.g., the length of the roller tube 210) between the first and second mounting brackets 220*a*, 220*b*. The bottom cover 204 may extend the length of the head rail assembly 200 (e.g., the length of the housing 230) and may cover the elongated slot 235 in the housing 230. The top cover 202 and the bottom cover 204 may be configured to attached to the head rail assembly 200 (e.g., to the first and second mounting brackets 220*a*, 220*b*) via one or more attachment mechanisms, such as snaps and/or fasteners (e.g., screws).

The housing 230 may house a battery holder 240 that may define a battery compartment 242 sized and may be configured to receive the one or more batteries 244 for powering the motor drive unit 260. For example, the housing 230 may define an internal compartment 239 that is sized and configured to receive the battery holder 240. The battery holder 240 may comprise a cable 246 (e.g., electrical wiring) with a plug 245 at its end. The cable 246 may be electrically connected to the batteries 244 in the battery holder 240. The plug 245 may be configured to be electrically and mechanically connected to the connector 266 of the motor drive unit 260 for powering the motor drive unit 260. The cable 246 may extend from the battery holder 240 to the motor drive unit 260 adjacent to the first bracket 220*a*. The battery holder 240 may comprise a spring (not shown) for pushing the batteries 244 together and holding the batteries 244 in the battery compartment 242 of the battery holder 240 when the Roman shade system 100 is installed. The number and type of batteries 244 that may be received in the battery compartment 242 of the battery holder 240 may be based on the type of window treatment system that will be supported. In some examples, the battery compartment 242 of the battery holder 240 may be sized and configured to receive five D-cell batteries, although one of ordinary skill in the art will understand that a different number and type (e.g., size and/or capacity) of batteries may be used depending on the power needs for a particular system. For example, while five D-cell batteries are referenced, one of ordinary skill in the art will understand that fewer (e.g., 1-4) or more batteries may be used. Additionally or alternatively, other types of batteries (e.g., A, AA, AAA, and/or lithium-ion batteries) may be used instead of D-cell batteries.

As shown in FIG. 12, the battery holder 240 may be disposed at or adjacent to the first end 222 of the housing 230. Locating the motor drive unit 260 in the first end 212 of the roller tube 210 and the battery holder 240 adjacent to the first end 222 of the housing 230 may enable the plug 245 of the battery holder 240 to be electrically connected to the connector 266 of the motor drive unit 260 and may allow the cable 246 to be made as short as possible. In addition, the internal compartment 239 of the housing 230 in which the battery holder 240 is housed may be located below the roller tube 210, which may allow for easy access to the batteries 244 in the battery holder 240 when the Roller shade system is installed to the structure. For example, the battery holder 240 may comprise a gap 248 (e.g., as shown in FIG. 16) through which the batteries 244 may be removed and replaced to allow for replacement of the batteries through the elongated slot 235 in the housing 230. Since the batteries 244 may be received through the gap 248 in the battery 240 and the elongated slot 235 in the housing 230, the batteries 244 may be replaced without unmounting the head rail assembly 200 from the structure.

The head rail assembly 200 may also comprise a lift assistance subsystem 250, which may be housed and/or supported by the housing 230. For example, the internal compartment 239 of the housing 230 may also be sized and configured to receive the lift assistance subsystem 250, such that both the battery holder 240 and the lift assistance subsystem 250 may be located in the internal compartment 239 of the housing 230. The lift assistance subsystem 250 may be configured to assist the motor drive unit 260 in the cavity 218 of the roller tube 210 with adjusting the shade fabric between first and second positions (e.g., fully-raised and fully-lowered positions). In some examples, such as when the shade fabric is a Roman shade fabric, the lift assistance subsystem 250 may include a lift assistance spring 252 that may be a variable force spring, such as a negative-gradient spring, which may have a negative gradient force profile (e.g., decreasing load with increasing deflection). The lift assistance spring 252 may comprise a shaft 254 that may be configured to rotate about a second axis 208 (FIG. 13). The negative-gradient spring may provide greater assistance (e.g., a greater force) when the shade fabric is near the fully-raised position compared as compared to when the shade fabric is near the fully-lowered position (e.g., as there is less torque required to move the roller tube 210 when the shade fabric is near the fully-lowered position compared to when the shade fabric is near the fully-raised position). In some examples, the lift assistance subsystem 250 may include the lift assistance spring 252 and a transmission (e.g., the transmission 138 as shown in FIGS. 7-9). When the lift assistance subsystem 250 includes the transmission, the lift assistance spring 252 may be a constant-force spring, and the transmission may be coupled to the shaft 254 and configured to adjust the amount of assistance (e.g., force) that is provided by the lift assistance subsystem 250. In some examples, the housing 230 may comprise a first internal compartment (not shown) at the first end 232 and a second internal compartment (not shown) at the second end 234. The first internal compartment at the first end 232 may be sized and configured to house the battery holder 240 and the second internal compartment at the second end 234 may be sized and configured to receive the lift assistance subsystem 250. In some examples, the lift assistance subsystem 250 may comprise multiple lift assistance springs (e.g., such as the lift assistance spring 252) coupled together to provide additional assistance.

Figure 17:
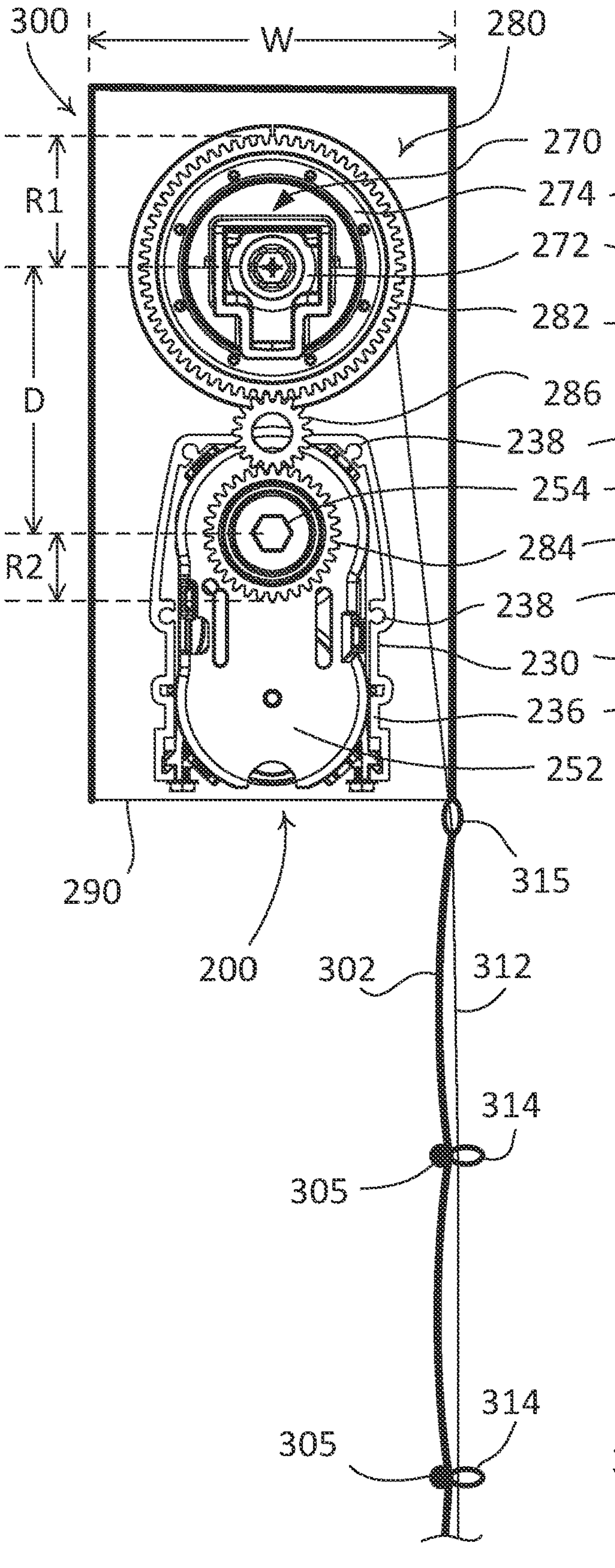
FIG. 17 is a right-side view of a Roman shade system that includes the head rail assembly of FIG. 12 when the Roman shade system is in a front-control configuration.
Figure 18:
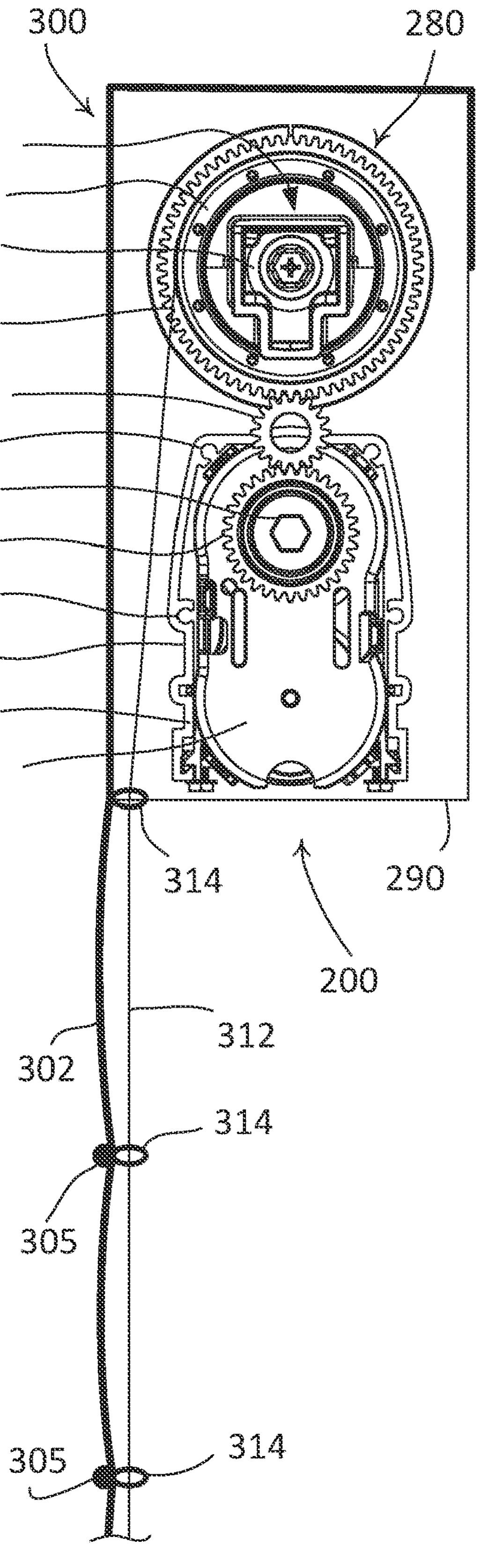
FIG. 18 is a right-side view of a Roman shade system that includes the head rail assembly of FIG. 12 when the Roman shade system in in a rear-control configuration.
Figure 19:
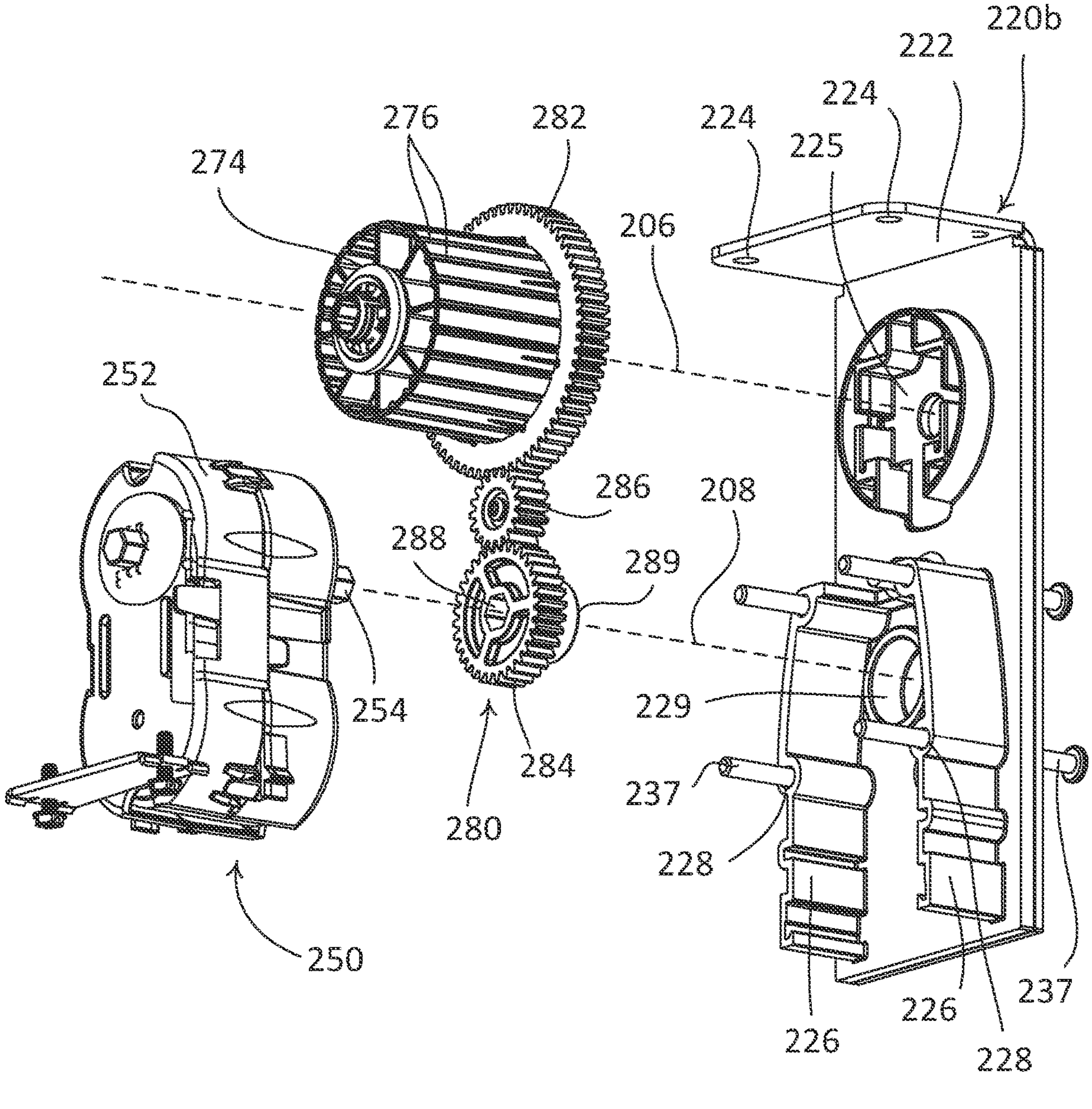
FIG. 19 is a partial exploded view of the head rail assembly of FIG. 12 showing a bracket, a lift assistance subsystem, and a gear assembly of the head rail assembly in greater detail.

The roller tube 210 may be coupled to the shaft 254 of the lift assistance spring 252 via a gear assembly 280. FIGS. 17-18 are right side views of a Roman shade system 300 in which the head rail assembly 200 may be installed (e.g., with the right-side bracket **220*b* not shown in order to illustrate the gear assembly 280 in greater detail). FIG. 17 shows the Roman shade system 300 in a front-control configuration (e.g., a rear-fabric configuration) and FIG. 18 shows the Roman shade system 300 in a rear-control configuration (e.g., a front-fabric configuration). FIG. 19 is a partial exploded view of the head rail assembly 200 showing the second bracket 220*b*, the light assistance subsystem 250, and the gear assembly 280 in greater detail. The gear assembly 280 may be supported by the second bracket 220*b* and may be configured to mechanically couple the roller tube 210 to the lift assistance spring 252 of the lift assistance subsystem 250 (e.g., as will be described in greater detail below). The head rail assembly 200 shown in FIGS. 12-16 may be used in the Roman shade system 300 in either the front-control configuration as shown in FIG. 17 or the rear-control configuration as shown in FIG. 18. This may allow a manufacturer (e.g., an original equipment manufacturer) to keep stock of the head rail assembly 200** and install the head rail assembly into Roman shade systems in either the front-control configuration or the rear-control configuration.

As shown in FIGS. 17 and 18, the head rail assembly 200 may be located in an enclosure 290 (e.g., which may hide the head rail assembly 200 from view). The Roman shade system 300 may include a shade fabric 302 that may be attached to and hang from the enclosure 290. The Roman shade system 300 may also include a plurality of rigid battens 305 (e.g., the battens 105), which are sewn into the shade fabric 302 and extend horizontally across the width of the shade fabric (e.g., as shown in FIG. 2). The Roman shade system 300 may also comprise cords 312 (e.g., the cords 112), which may be coupled to the roller tube 210 of the head rail assembly 200, and may wrap around the roller tube 210 (e.g., between the collars 216). The cords 312 may also be attached to a lowest one of the battens 305 (e.g., the batten **105*a*) and pass through a plurality of eyelets 314 (e.g., attachment points) that are coupled to the shade fabric 302 (e.g., to the battens 305). As the roller tube 210 rotates, the cords 312 are either wound around the roller tube 210 or unwound from the roller tube 210 depending on the direction of the rotation. As with the Roman shade system 100 shown in FIGS. 1-3, when the cords 312 are wound around the roller tube 210, the cords 312 may pull on the battens 305 to cause the shade fabric 302 to raise. The battens 305 may allow the shade fabric 302 may fold into a plurality of pleats (e.g., the pleats 104) as the Roman shade system 300 is opened. While the Roman shade system 300 is shown with the enclosure 290 in FIGS. 17 and 18, the head rail assembly 200 may also be installed without the enclosure 290 and the top end of the shade fabric 302 may be attached to a portion of the structure of the building around the head rail assembly 200**.

In the front-control configuration shown in FIG. 17, the head rail assembly 200 may be located towards the room in which the Roman shade system 300 is installed and the shade fabric 302 may be located towards the window that the Roman shade system 300 is adapted to cover (e.g., the window may be located to the right of the shade fabric 302 as shown in FIG. 17). The cords 312 may extend from the roller tube 210 through an opening 315 in the shade fabric 302 towards the lowest one of the battens 305 between the shade fabric 302 and the window. In the front-control configuration, the shade fabric 302 may hang from the window-side of the enclosure 290 and may wrap around the enclosure 290 as shown in FIG. 17 to provide an aesthetically pleasing appearance for the enclosure 290.

In the rear-control configuration shown in FIG. 18, the head rail assembly 200 may be located towards the window that the Roman shade system 300 is adapted to cover and the shade fabric 302 may be located towards the room in which the Roman shade system 300 is installed (e.g., the window may be located to the right of the shade fabric 302 as shown in FIG. 18). The cords 312 may extend from the roller tube 210 towards the lowest one of the battens 305 between the shade fabric 302 and the window. In the rear-control configuration, the shade fabric 302 may hang from the room-side of the enclosure 290 and may wrap at least partially around the enclosure 290 as shown in FIG. 18 to provide an aesthetically pleasing appearance for the enclosure 290.

The gear assembly 280 may comprise a first gear 282 that may be coupled (e.g., fixedly coupled) to the roller tube 210 (e.g., to the second end 214 of the roller tube 210) and may be configured to rotate about the first axis 206. For example, the idler assembly 270 may comprise a stationary portion 272 (FIGS. 17 and 18) configured to be attached to (e.g., fixedly attached to) the attachment structure 225 (FIG. 19) of the second bracket 220*b*. The idler assembly 270 may also comprise a rotatable portion 274 configured to be received in the second end 214 of the roller tube 210 and attached to (e.g., fixedly attached to) the roller tube 210. For example, the rotatable portion 274 may comprise notches 276 configured to receive ribs (not shown) on an inner surface of the roller tube for fixedly attaching the rotatable portion 274 to the roller tube 210. The rotatable portion 274 may be configured to rotate around the stationary portion 272, e.g., as the motor drive unit 260 rotates the roller tube 210. For example, the stationary portion 272 and the rotatable portion 274 may meet at a bearing surface (not shown). The first gear 282 may be connected to (e.g., formed as a part of) the rotatable portion 274 of the idler assembly 270, such that the first gear 282 rotates as the roller tube 210 rotates.

The gear assembly 280 may also comprise a second gear 284 that may be coupled (e.g., fixedly coupled) to the shaft 254 of the lift assistance spring 250 and may be configured to rotate about the second axis 208. The second gear 284 may comprise an opening 288 configured to receive and attach to the shaft 254 of the lift assistance spring 250. The second gear 284 may also comprise a drum 289 (e.g., a cylindrical drum) configured to be received (e.g., rotatably received) within an opening 229 (e.g., a cylindrical opening) in the second bracket 220*b*.

The first and second axes 206, 208 may be spaced apart by a distance D. The first gear 282 may have a first radius R1 and the second gear 284 may have a second radius R2. For example, the first and second gears 282, 284 may be sized to minimize a width of the Roman shade system 300 (e.g., a width of the head rail assembly 200 and/or a width W of the enclosure 290 as shown in FIG. 17). The size of the first gear 282 may be limited by a desired value for the width of the Roman shade system 300 and the second gear 284 may be sized to achieve a desired gear ratio between the first and second gears 282, 284. Since the distance D between the axes 206, 208 may be greater than the sum of the radii R1, R2 of the first and second gears 282, 284, the gear assembly 280 may comprise a third gear 286 located between the first and second gears 282, 284. The second bracket 220*b* may support the first, second, and third gears 282, 284, 286 of the gear assembly 280. The engagement between the first, second, and third gears 282, 284, 286 of the gear assembly 280 may provide the connection through which the lift assistance subsystem 250 provides the assistance to the motor of the motor drive unit 260 in moving the shade fabric 302.

In operation, the motor of the motor drive unit 260 may cause the roller tube 210 to rotate in either a first direction (e.g., clockwise) or a second direction (e.g., counterclockwise) depending on whether the shade fabric 302 is to be moved toward the fully-lowered position or toward the fully-raised position. As the roller tube 210 rotates, the cords 312 may either wound around the roller tube 210 (e.g., guided by the collars 216) or unwound from the roller tube 210 depending on the direction of the rotation. When the cords 312 are wound around the roller tube 210, the cords 312 may pull on the battens 305 to cause the shade fabric 302 to raise and fold. For example, if starting in the fully-lowered position, rotation of the roller tube 210 may cause the cords 312 to wind around the roller tube 210, which may result in the lowest one of the battens 305 (e.g., along with the shade fabric 302) being pulled in an upward direction. When the lowest one of the battens 305 contacts the next highest batten, both the lowest one of the battens 305 and the next highest batten may move together in an upward direction. When lowering of the shade fabric 302, all of the battens 305 may move together until a pleat is fully expanded at which point the upper-most batten may stop moving (e.g., due to its engagement with the shade fabric 302) and the remainder of the lower battens 305 may continue to move in a downward direction until all of the battens 305 reach their lowest position.

As discussed above, the lift assistance subsystem 250 may provide variable assistance, which is based on the position of the shade fabric 302. The lift assistance subsystem 250 may be coupled to the roller tube 210 via the gear assembly 280. For example, when the lift assistance subsystem 210 includes the lift assistance spring 252 that is a variable force spring (e.g., a negative gradient spring), the lift assistance subsystem 250 may vary the amount of force that is transmitted to the gear assembly 280 (e.g., and thus to the roller tube 210) to provide greater assistance (e.g., a greater force) when the shade fabric 302 is near the fully-raised position compared to when the shade fabric 302 is near the fully-lowered position (e.g., as there is less torque required to move the roller tube 210 when the shade fabric 302 is near the fully-lowered position compared to when the shade fabric 302 is near the fully-raised position). When the lift assistance spring 252 of the lift assistance subsystem 250 is a constant force spring, the lift assistance subsystem 250 may also include a transmission (e.g., the transmission 138 shown in FIGS. 7-9) such that the lift assistance subsystem 250 may still provide variable assistance depending on the position of the shade fabric 302. The lift assistance subsystem 250 may apply a variable force (e.g., negative gradient force) to provide assistance to the roller tube 210 for lifting the shade fabric 302.

Although the present disclosure has been described in relation to particular examples thereof, many other variations and modifications and other uses will become apparent to those skilled in the art. For example, although the kits, systems, and methods have been described in relation to Roman shades, it should be understood that the concepts may be applied to other types of window treatments, such as Venetian blinds and cellular shades, to list only a couple of possibilities.

What is claimed is:

1. A shade system comprising:

first and second brackets for mounting the shade system to a structure;

a motor drive unit;

a lift assistance subsystem;

a roller tube extending from a first end to a second end and defining at least one internal cavity, the roller tube rotatably supported by the first and second brackets, the at least one internal cavity sized and configured to receive the motor drive unit therein;

a housing extending from a first end to a second end and supported by the first and second brackets, the housing configured to receive, at the first end of the housing, one or more batteries for powering the motor drive unit inside the roller tube, the housing also configured to support the lift assistance subsystem at the second end of the housing; and a Roman shade fabric having a top end adapted to be fixedly connected adjacent to the housing and a bottom end adapted to move between a first position and a second position, the Roman shade fabric coupled to the roller tube by a plurality of cords that wind and unwind around the roller tube as the Roman shade fabric is moved between the first position and the second position;

wherein the lift assistance subsystem is configured to provide variable lift assistance to the motor drive unit.

2. The shade system of claim 1, wherein the cords are wrapped around the roller tube between respective pairs of collars that wrap around the roller tube.

3. The shade system of claim 1, wherein the cords are received in grooves of respective spools on the roller tube.

4. The shade system of claim 1, wherein the first bracket is configured to be coupled to the first end of the roller tube and to the first end of the housing, and the second bracket is configured to be coupled to the second end of the roller tube and to the second end of the housing.

5. The shade system of claim 4, further comprising:

a battery holder configured to hold the one or more batteries and to be received within the housing.

6. The shade system of claim 5, wherein the battery holder comprises a cable with a plug at its end, the plug configured to be connected to a connector on the motor drive unit for electrically connecting to the battery holder, the cable configured to extend from the battery holder to the motor drive unit adjacent to the first bracket.

7. The shade system of claim 5, wherein the housing defines an internal compartment configured to receive the battery holder at the first end of the housing and to receive the lift assistance subsystem at the second end of the housing.

8. The shade system of claim 5, wherein the motor drive unit is located in the first end of the roller tube, the motor drive unit comprising an end portion configured to be supported by the first bracket, the motor drive unit electrically coupled to the battery holder via electrical wiring that extends from the motor drive unit to the battery holder adjacent to the first bracket.

9. The shade system of claim 8, further comprising a gear assembly configured to mechanically couple the roller tube to the lift assistance subsystem, wherein the second bracket is configured to support the gear assembly.

10. The shade system of claim 9, wherein the lift assistance subsystem includes a lift assistance spring.

11. The shade system of claim 10, wherein the lift assistance spring is a variable force spring having a negative gradient force profile.

12. The shade system of claim 11, wherein the lift assistance spring comprises a shaft coupled to the gear assembly.

13. The shade system of claim 10, wherein the lift assistance spring is a constant force spring, and the lift assistance subsystem includes a transmission coupled between the lift assistance spring and the gear assembly, such that the lift assistance subsystem is characterized by a negative gradient force profile.

14. The shade system of claim 13, wherein the transmission comprises a first spool coupled the gear assembly, a second spool coupled to a shaft of the constant force spring, and a cord wrapped around the first spool and the second spool, such that rotation of the first spool results in rotation of the second spool, and wherein at least one of the first and second spools has a diameter that varies with length of the respective spool.

15. A shade system comprising:

first and second brackets for mounting the shade system to a structure;

a motor drive unit;

a lift assistance subsystem;

a roller tube extending from a first end to a second end and defining at least one internal cavity, the roller tube rotatably supported by the first and second brackets, the at least one internal cavity sized and configured to receive the motor drive unit therein;

a housing extending from a first end to a second end and supported by the first and second brackets, the housing configured to receive, at the first end of the housing, one or more batteries for powering the motor drive unit inside the roller tube, the housing also configured to support the lift assistance subsystem at the second end of the housing, the lift assistance subsystem configured to provide variable lift assistance to the motor drive unit, wherein the first bracket is configured to be coupled to the first end of the roller tube and to the first end of the housing, and the second bracket is configured to be coupled to the second end of the roller tube and to the second end of the housing;

a battery holder configured to hold the one or more batteries and to be received within the housing; and a gear assembly configured to mechanically couple the roller tube to the lift assistance subsystem, the gear assembly comprising a first gear coupled to the roller tube, a second gear coupled to the lift assistance subsystem, and a third gear configured to engage the first and second gears, wherein the second bracket is configured to support the gear assembly;

wherein the motor drive unit is located in the first end of the roller tube, the motor drive unit comprising an end portion configured to be supported by the first bracket, the motor drive unit electrically coupled to the battery holder via electrical wiring that extends from the motor drive unit to the battery holder adjacent to the first bracket.

16. The shade system of claim 15, further comprising:

an idler assembly comprising a stationary portion configured to be attached to the second bracket and a rotatable portion attached to the roller tube and to rotate about the stationary portion as the roller tube rotates;

wherein the first gear is connected to the rotatable portion of the idler assembly.

17. The shade system of claim 16, wherein the lift assistance subsystem comprises a lift assistance spring and the second gear is mechanically attached to a shaft of the lift assistance spring, and wherein the second gear comprises a cylindrical drum configured to be received within a cylindrical opening in the second bracket, the second gear configured to rotate the shaft of the lift assistance spring as the motor drive unit rotates the roller tube.

18. The shade system of claim 15, further comprising:

an idler assembly comprising a stationary portion configured to be attached to the second bracket and a rotatable portion attached to the roller tube and to rotate about the stationary portion as the roller tube rotates, wherein the first gear is connected to the rotatable portion of the idler assembly;

wherein the lift assistance subsystem comprises a lift assistance spring and the second gear is mechanically attached to a shaft of the lift assistance spring, and wherein the second gear comprises a cylindrical drum configured to be received within a cylindrical opening in the second bracket, the second gear configured to rotate the shaft of the lift assistance spring as the motor drive unit rotates the roller tube.

19. A shade system comprising:

first and second brackets for mounting the shade system to a structure;

a motor drive unit;

a lift assistance subsystem;

a roller tube extending from a first end to a second end and defining at least one internal cavity, the roller tube rotatably supported by the first and second brackets, the at least one internal cavity sized and configured to receive the motor drive unit therein;

a housing extending from a first end to a second end and supported by the first and second brackets, the housing configured to receive, at the first end of the housing, one or more batteries for powering the motor drive unit inside the roller tube, the housing also configured to support the lift assistance subsystem at the second end of the housing, the lift assistance subsystem configured to provide variable lift assistance to the motor drive unit, wherein the first bracket is configured to be coupled to the first end of the roller tube and to the first end of the housing, and the second bracket is configured to be coupled to the second end of the roller tube and to the second end of the housing;

a battery holder configured to hold the one or more batteries and to be received within the housing; and a gear assembly configured to mechanically couple the roller tube to the lift assistance subsystem, wherein the second bracket is configured to support the gear assembly;

wherein the motor drive unit is located in the first end of the roller tube, the motor drive unit comprising an end portion configured to be supported by the first bracket, the motor drive unit electrically coupled to the battery holder via electrical wiring that extends from the motor drive unit to the battery holder adjacent to the first bracket; and wherein the first bracket and the second bracket are configured such that the shade system is attachable to the structure in at least a first and a second configuration, wherein in the first configuration the roller tube is disposed vertically above the housing, and wherein in the second configuration, the housing is disposed vertically above the roller tube.

20. The shade system of claim 19, wherein each of the first bracket and the second bracket include at least one first flange disposed at a first end of the respective first bracket and second bracket and at least one second flange disposed at a second end of the respective first bracket and second bracket and that is opposite the first end.

21. The shade system of claim 20, wherein the at least one first flange and the at least one second flange of the respective first bracket and second bracket each defines at least one aperture sized and configured to receive a fastener for securing either the first flange or the second flange to the structure.

22. The shade system of claim 9, wherein the first bracket and the second bracket are configured such that the roller tube is disposed vertically above the housing when the shade system is attached to the structure, the battery holder comprising a gap configured to allow the batteries to be inserted and removed from the shade system through a bottom of the housing.

23. The shade system of claim 9, wherein the gear assembly comprises a first gear engaged with a second gear, the first gear coupled to the roller tube and the second gear coupled to the lift assistance subsystem.

24. The shade system of claim 9, wherein the gear assembly comprises a first gear coupled to the roller tube, a second gear coupled to the lift assistance subsystem, and a third gear configured to engage the first and second gears.

25. The shade system of claim 9, wherein the first bracket and the second bracket are configured such that the shade system is attachable to the structure in at least a first and a second configuration, wherein in the first configuration the roller tube is disposed vertically above the housing, and wherein in the second configuration, the housing is disposed vertically above the roller tube.

* * * * *